US012235596B2

(12) United States Patent
Ahn et al.

(10) Patent No.: US 12,235,596 B2
(45) Date of Patent: Feb. 25, 2025

(54) TONER REFILL CARTRIDGE INDICATING WHETHER TONER HAS BEEN DISCHARGED

(71) Applicant: Hewlett-Packard Development Company, L.P., Spring, TX (US)

(72) Inventors: Seungbin Ahn, Seongnam Si (KR); Woongyong Choi, Seongnam Si (KR); Shinhyup Kang, Seongnam Si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/292,845

(22) PCT Filed: Dec. 7, 2021

(86) PCT No.: PCT/US2021/072781

§ 371 (c)(1),
(2) Date: Jan. 26, 2024

(87) PCT Pub. No.: WO2023/018440

PCT Pub. Date: Feb. 16, 2023

(65) Prior Publication Data

US 2025/0004395 A1 Jan. 2, 2025

(30) Foreign Application Priority Data

Aug. 9, 2021 (KR) ........................ 10-2021-0104441

(51) Int. Cl.

| | |
|---|---|
| ***G03G 15/00*** | (2006.01) |
| ***G03G 15/08*** | (2006.01) |
| ***G03G 21/16*** | (2006.01) |

(52) U.S. Cl.
CPC ..... *G03G 15/0867* (2013.01); *G03G 15/0889* (2013.01); *G03G 15/5016* (2013.01); *G03G 21/1647* (2013.01)

(58) Field of Classification Search
CPC ........... G03G 15/0867; G03G 15/0889; G03G 15/5016; G03G 21/1647; G03G 21/1676
See application file for complete search history.

(56) References Cited

U.S. PATENT DOCUMENTS 6,330,402 B1 12/2001 Sakurai et al.
11,294,301 B2 * 4/2022 Ahn .................. G03G 15/0867
(Continued)

FOREIGN PATENT DOCUMENTS

EP 2662733 A2 11/2013
JP 06-019314 A 1/1994
(Continued)

*Primary Examiner* — Sophia S Chen
(74) *Attorney, Agent, or Firm* — Foley & Lardner LLP

(57) ABSTRACT

A toner refill cartridge includes a body member in which a toner is contained and which includes a toner discharge port through which the toner is discharged: a driving power input portion rotatable by a driving power from outside the toner refill cartridge; an agitating member to agitate the toner while being rotated by a rotation power from the driving power input portion; and a discharge completion display module including a moving display portion to move in response to the rotation power from the driving power input portion, and a fixed display portion whose position is fixed with respect to the body member, the discharge completion display module to indicate whether the toner contained in the body member has been completely discharged, based on a position relationship of the moving display portion with respect to the fixed display portion.

16 Claims, 26 Drawing Sheets

(56) References Cited

U.S. PATENT DOCUMENTS

| | | | |
|---|---|---|---|
| 11,397,390 B2 * | 7/2022 | Kim | G03G 15/087 |
| 2004/0101331 A1 | 5/2004 | Himes | |
| 2011/0311242 A1 | 12/2011 | Tanda | |

FOREIGN PATENT DOCUMENTS

| | | | |
|---|---|---|---|
| JP | 2013-015804 | A | 1/2013 |
| KR | 10-0185093 | B1 | 4/1999 |
| RU | 2660387 | C1 | 7/2018 |
| WO | 2021/061188 | A1 | 4/2021 |

* cited by examiner

TONER REFILL CARTRIDGE INDICATING WHETHER TONER HAS BEEN DISCHARGED

CROSS-REFERENCE TO RELATED APPLICATIONS

This application is a U.S. National Stage Patent Application under 35 U.S.C. § 371 of PCT/US2021/072781, filed Dec. 7, 2021, which claims priority to Korean Patent Application No. 10-2021-0104441, filed Aug. 9, 2021, which are hereby incorporated by reference in their entireties.

BACKGROUND

Image forming apparatuses using an electrophotographic method supply toner to an electrostatic latent image formed on an optical scanner to form a visible toner image on the optical scanner, transfer the visible toner image to a print medium via an intermediate transfer medium or directly, and then fuse the transferred visible toner image on the print medium.

A developing cartridge contains toner and supplies the toner to an electrostatic latent image formed on an optical scanner to form a visible toner image. When the toner contained in the developing cartridge is entirely consumed, the developing cartridge may be removed from the main body of an image forming apparatus, and a new developing cartridge may be mounted in the main body. Alternatively, a developing cartridge may be refilled with new toner by mounting a toner refill kit (a toner refill cartridge) in a toner refilling portion.

BRIEF DESCRIPTION OF THE DRAWINGS

FIG. 10 shows the discharge completion display module in a state before a toner is discharged, and FIG. 11 shows the discharge completion display module in a state in which the toner has been completely discharged.

DETAILED DESCRIPTION

Figure 1:
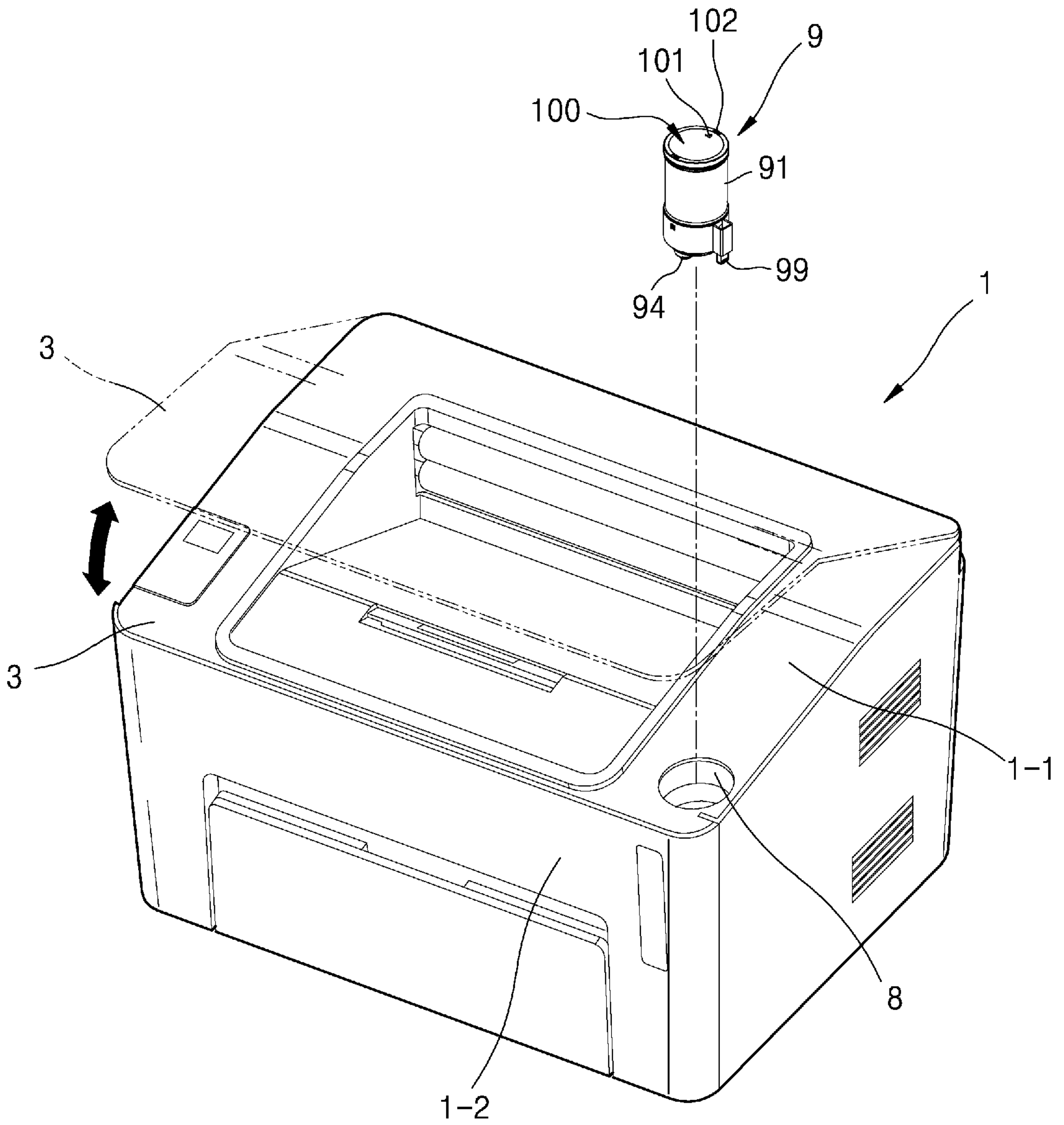
FIG. 1 is a schematic exterior perspective view of an example of an electrophotographic image forming apparatus.

Toner refill cartridges may be divided into a toner refill cartridge that manually discharges a toner that is directly pressurized by a user, and a toner refill cartridge that receives a driving power from a main body and automatically discharges the toner without being pressurized by the user.

A toner refill cartridge that manually discharges the toner employs a physical force of the user, which may cause inconvenience to the user, whereas the toner refill cartridge that automatically discharges the toner does not employ the physical force of the user, which may improve user convenience.

A user may have a difficulty in identifying whether the toner has been completely discharged from the toner refill cartridge that automatically discharges the toner, unlike with the toner refill cartridge that manually discharges the toner. An external shape of the toner refill cartridge that manually discharges the toner, for example, a syringe-type toner refill cartridge, changes due to a plunger pressed by the user, and accordingly, the user may easily know whether the toner has been completely discharged by identifying a change in the external shape of the toner refill cartridge. On the other hand, even when the toner has been completely discharged from the toner refill cartridge that automatically discharges the toner, because the external shape of the toner refill cartridge does not change, the user may not easily identify whether the toner has been completely discharged.

To address the foregoing issue associated with a toner refill cartridge that automatically discharges the toner, the toner refill cartridge of an example includes a body member provided with a toner discharge port through which the toner is automatically discharged, a driving power input portion that receives a driving power from the outside and rotates, an agitating member that agitates the toner while rotating by receiving a rotation power from the driving power input portion, and a discharge completion display module indicating whether the toner accommodated in the body member has been completely discharged so that the user may easily identify whether the toner has been completely discharged.

The discharge completion display module includes a moving display portion that receives a rotation power from the driving power input portion to move a position of the moving display portion, and a fixed display portion whose position is fixed with respect to the body member. The toner refill cartridge of an example indicates whether the toner contained inside the body member has been completely discharged, according to a position relationship of the moving display portion with respect to the fixed display portion, and thus the user may easily identify whether the toner has been completely discharged from the inside of the toner refill cartridge.

Hereinafter, examples of a toner refill cartridge and an image forming apparatus in which the toner refill cartridge is mounted are described in detail with reference to the accompanying drawings. In addition, in the specification and drawings, components having substantially the same functional configuration are denoted by the same reference numerals, and thus redundant descriptions are omitted.

Figure 2:
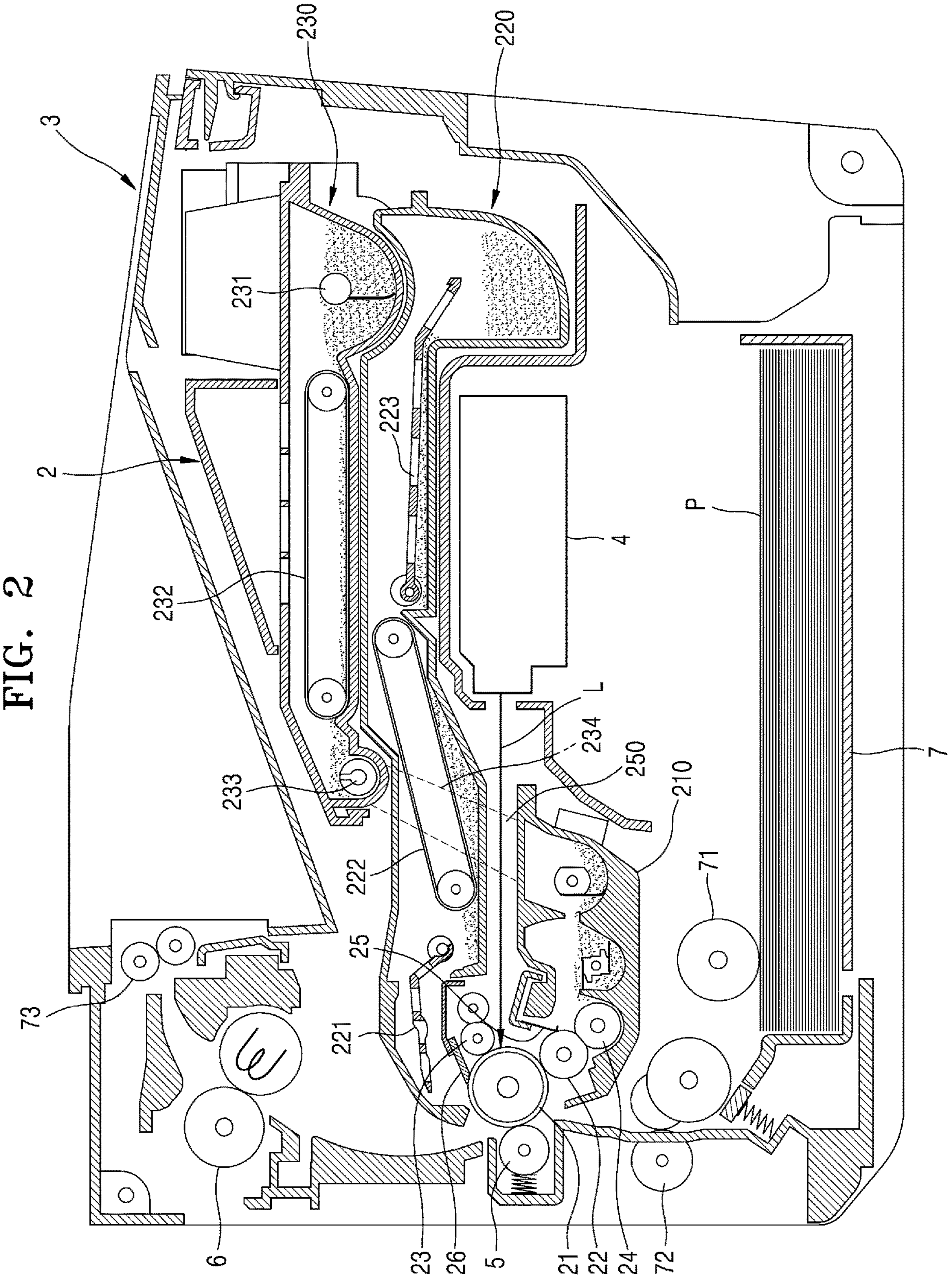
FIG. 2 is a schematic view of the configuration of an example of the electrophotographic image forming apparatus shown in FIG. 1.
Figure 3:
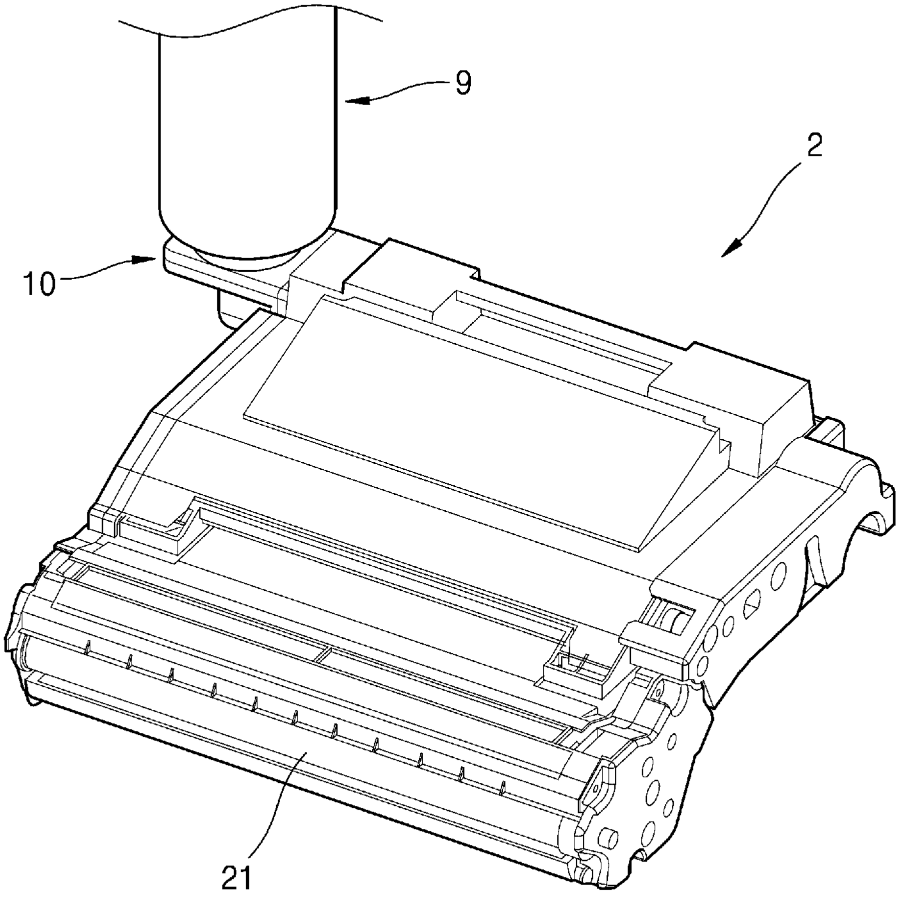
FIG. 3 is a perspective view of an example of a developing cartridge employed in an example of the electrophotographic image forming apparatus shown in FIG. 1.

FIG. 1 is a schematic exterior perspective view of an example of an electrophotographic image forming apparatus. FIG. 2 is a schematic view of the configuration of an example of the electrophotographic image forming apparatus shown in FIG. 1. FIG. 3 is a perspective view of an example of a developing cartridge 2 employed in an example of the electrophotographic image forming apparatus shown in FIG. 1.

Referring to FIGS. 1 to 3, the image forming apparatus may include a main body 1 and a developing cartridge 2 that is detachably attached to the main body 1. A door 3 may be provided in the main body 1. Although the door 3 opens an upper portion of the main body 1 in FIG. 1, in other examples, a door can open a side or all portions of the main body 1. The developing cartridge 2 may be mounted/removed in/from the main body 1 by opening the door 3.

The image forming apparatus includes a photosensitive drum 21, which is an example of a photoconductor on which an electrostatic latent image is formed. The photosensitive drum 21 may include a cylindrical metal pipe and a photoconductive layer formed on an outer periphery thereof. A charging roller 23 is an example of a charger that charges a surface of the photosensitive drum 21 to a uniform electric potential. A charging bias voltage is applied to the charging roller 23. A corona charger (not shown) may be used instead of the charging roller 23.

An optical scanner 4 scans light modulated according to image information onto the surface of the photosensitive drum 21 charged to the uniform electric potential. In an example, the optical scanner 4 includes a laser scanning unit (LSU) that scans the photosensitive drum 21 by deflecting light emitted from a laser diode in a main scanning direction using a polygon mirror.

A developing roller 22 supplies the toner to an electrostatic latent image formed on the surface of the photosensitive drum 21 and develops the electrostatic latent image. In an example, a one-component contact developing method is employed in which the toner is used as a developer and the developing roller 22 and the photosensitive drum 21 are in contact with each other to form a developing nip. When a developing bias voltage is applied to the developing roller 22, the toner moves and adheres to the electrostatic latent image formed on the surface of the photosensitive drum 21 through a developing nip. A supply roller 24 supplies the toner to be adhered to the developing roller 22. A supply bias voltage may be applied to the supply roller 24 to adhere the toner to the developing roller 22. A regulating member 25 regulates an amount of toner adhered to the surface of the developing roller 22. A cleaning member 26 removes a residual toner and foreign matter from the surface of the photosensitive drum 21 before charging.

A transfer roller 5 is an example of a transfer unit that is positioned to face the photosensitive drum 21 to form a transfer nip. A transfer bias voltage for transferring the toner image developed on the surface of the photosensitive drum 21 to a print medium P is applied to the transfer roller 5. The print medium P withdrawn from a loader 7 by a pickup roller 71 is transferred by the transfer roller 72 to the transfer nip where the transfer roller 5 and the photosensitive drum 21 face each other. The toner image transferred to a surface of the print medium P by the transfer roller 5 is maintained on the surface of the print medium P by electrostatic attraction. A fuser 6 forms a permanent printed image on the print medium P by applying heat and pressure to the toner image and fusing the toner image on the print medium P. The print medium P on which printing is completed is discharged to the outside of the main body 1 by a discharge roller 73.

Referring to FIGS. 2 and 3, the developing cartridge 2 of the example may include a developing portion 210 in which the photosensitive drum 21 and the developing roller 22 are installed, a waste toner container 220 in which a waste toner removed from the photosensitive drum 21 is contained, and a toner container 230 connected to the developing portion 210 and in which the toner is contained. A toner refilling portion 10 provides an interface between a toner refill cartridge 9 and a developing cartridge 2, which are described later, in order to refill the toner container 230 with the toner.

The waste toner container 220 is located on an upper side of the developing portion 210, and an optical path 250 is formed between the waste toner container 220 and the developing portion 210. Waste toner removed from the photosensitive drum 21 by the cleaning member 26 is contained in the waste toner container 220. The waste toner is transported into the waste toner container 220 by one or more waste toner transporting members 221, 222, and 223.

The toner container 230 is connected to the toner refilling portion 10 to receive the toner. The toner container 230 is connected to the developing portion 210 by a toner supply portion 234 as shown by a dotted line in FIG. 2. The toner supply portion 234 is located outside the effective width of the exposure light L so as not to interfere with the exposure light L scanned in the main scanning direction by the optical scanner 4. One or more toner supply members 231, 232, and 233 for supplying the toner to the developing portion 210 through the toner supply portion 234 may be installed in the toner container 230. The toner supply member 233 may convey the toner in the main scanning direction to transfer the toner to the toner supply portion 234.

The developing cartridge 2 supplies toner contained in the toner container 230 to an electrostatic latent image formed on the photosensitive drum 21 to develop a visible toner image. The developing cartridge 2 is detachable from the main body 1. According to the image forming apparatus of an example, the toner may be refilled in the developing cartridge 2 while the developing cartridge 2 is mounted on the main body 1, without removing the developing cartridge 2 from the main body 1.

Figure 4:
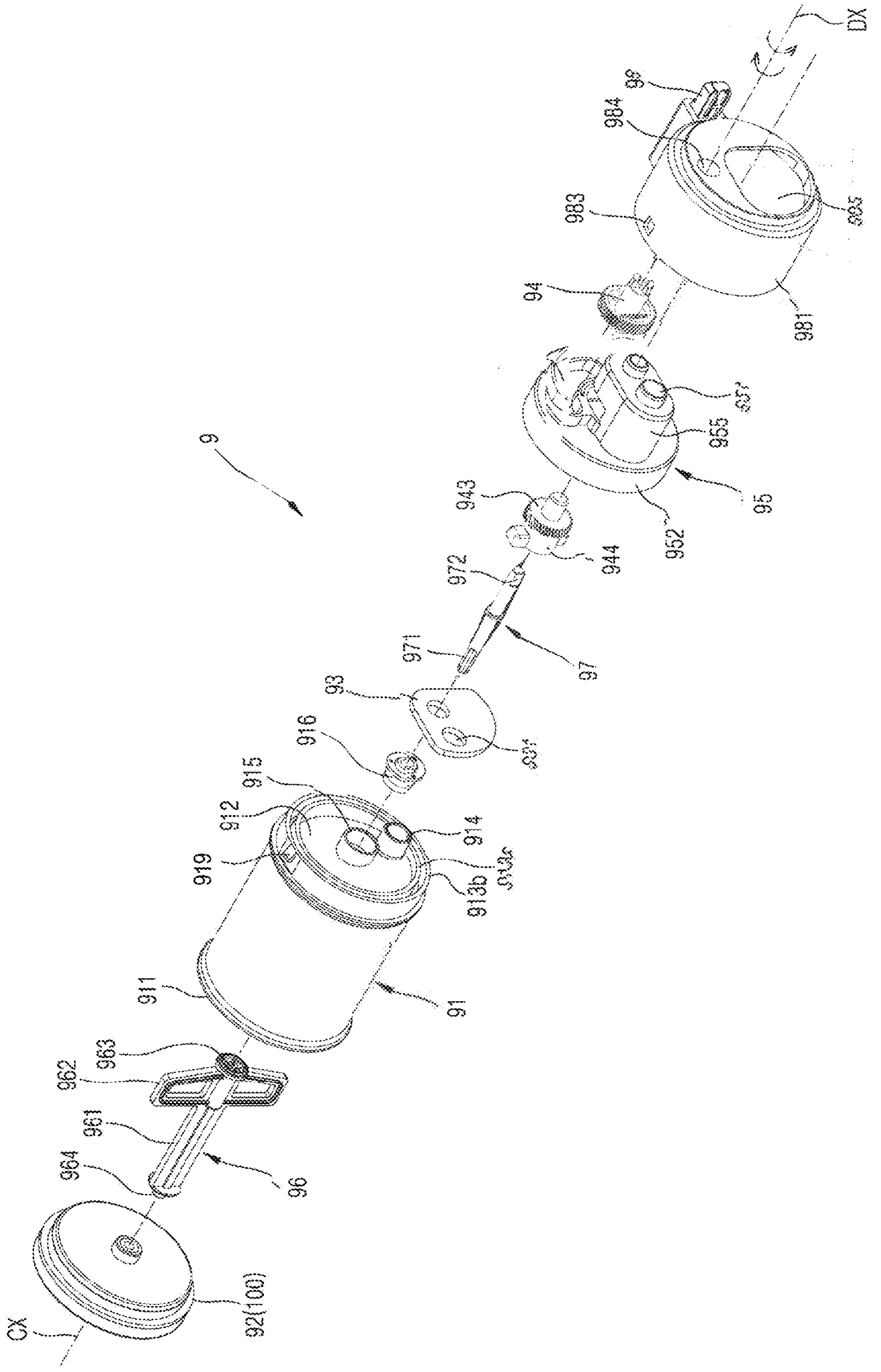
FIG. 4 is an exploded perspective view of an example of a toner refill cartridge.

As shown in FIGS. 1 and 4, the toner refill cartridge 9 includes a body member 91 that contains the toner therein and includes a toner discharge port 914 (FIG. 4), and a communicator 99 for communication between the toner refill cartridge 9 and the main body 1. The communicator 99 is electrically connected to the main body 1 when the toner refill cartridge 9 is mounted on the toner refilling portion 10. The communicator 99 may perform functions such as indicating whether the toner refill cartridge 9 is mounted on the toner refilling portion 10, and transmission of information of the toner refill cartridge 9. The communicator 99 may include a so-called customer replaceable unit monitor (CRUM).

The main body 1 includes a communicating portion 8 to access the toner refilling portion 10 from the outside of the main body 1 with the developing cartridge 2 mounted thereon. For example, the communicating portion 8 may be provided at a position close to a front portion 1-2 on an upper surface 1-1 of the main body 1. The toner refilling portion 10 is located in a lower portion of the communicating portion 8. When the toner refill cartridge 9 is inserted into the communicating portion 8 from above of the main body 1, the toner refill cartridge 9 may be connected to the toner refilling portion 10 as shown in FIG. 3. In this state, the toner contained in the body member 91 may be discharged through the toner discharge port 914 and supplied to the toner container 230 of the developing cartridge 2 through the toner refilling portion 10. The toner refill cartridge 9 is removed from the communicating portion 8 after toner refilling.

FIG. 4 is an exploded perspective view of an example of the toner refill cartridge 9. Referring to FIG. 4, the toner refill cartridge 9 includes the body member 91, a driving power input portion 94, an agitating member 96, and a discharge completion display module 100.

A toner is contained in the body member 91. A lid 92 is combined with one end 911 of the body member 91. The toner discharge port 914 through which the toner is discharged is provided at the other end 912 of the body member 91. The toner discharge port 914 may have, for example, a cylindrical shape and may protrude from the other end 912 of the body member 91.

A shutter 95 opens and closes the toner discharge port 914. The shutter 95 is rotatably combined with the other end 912 of the body member 91. As an example, the shutter 95 may be rotated with respect to a central axis CX of the body member 91. The body member 91 may include first support portions 913*a* and 913*b* protruding from the other end 912 in the cylindrical shape. The shutter 95 may include a second support portion 952 having a cylindrical shape that is rotatably supported inside the first support portions 913*a* and 913*b*.

The shutter 95 may be rotated to a closing position that blocks the toner discharge port 914 and an opening position that opens the toner discharge port 914. The toner discharge port 914 may be positioned to be deviated in a radial direction from the central axis CX. The shutter 95 may include an opening 951 deviated in a radial direction from the central axis CX. The deviation amounts of the toner discharge port 914 and the opening 951 from the central axis CX may be the same.

When the shutter 95 is rotated with respect to the central axis CX, the toner discharge port 914 and the opening 951 may be misaligned or aligned with each other according to a rotation phase. In the closing position, the opening 951 is misaligned with the toner discharge port 914, and the toner discharge port 914 is closed. In the opening position, the opening 951 is aligned with the toner discharge port 914, and the toner discharge port 914 is opened. When the toner discharge port 914 is opened, the toner may be discharged through the toner discharge port 914 and the opening 951.

The shutter 95 is reciprocally rotated to the closing position and the opening position according to a rotation direction of the driving power input portion 94. A cover 981 includes a stopper that blocks the shutter 95 from being rotated beyond the closing position and the opening position. For example, a through hole 985 having a sector shape is provided in the cover 981. The shutter 95 includes an insertion portion 955 inserted into the through hole 985. When the shutter 95 is in the closing position, the insertion portion 955 is in contact with an edge of the through hole 985 in a first direction to prevent the shutter 95 from being rotated beyond the closing position. When the shutter 95 is in the opening position, the insertion portion 955 is in contact with an edge of the through hole 985 in a second direction to prevent the shutter 95 from being rotated beyond the opening position.

A sealing member 93 preventing a toner leakage may be interposed between the shutter 95 and the toner discharge port 914. The sealing member 93 may be rotated together with the shutter 95. The sealing member 93 may be, for example, a sponge. An opening 931 of the sealing member 93 is aligned with the opening 951 of the shutter 95. When the shutter 95 is in the closing position, the sealing member 93 blocks the toner discharge port 914, and when the shutter 95 is in the opening position, the opening 931 of the sealing member 93 and the opening 951 of the shutter 95 are aligned with the toner discharge port 914.

The driving power input portion 94 may be exposed to the outside of the toner refill cartridge 9. The driving power input portion 94 may be exposed to the outside of the toner refill cartridge 9, for example, through a power connecting opening 984. The driving power input portion 94 is rotated by receiving a driving power from the outside. For example, the driving power input portion 94 may be in the form of a coupler that is rotated by receiving a rotation power from the main body 1. However, the form of the driving power input portion 94 is not limited thereto, and may be varied as long as it is a configuration that is rotated by receiving the rotation power from the outside. For example, when the toner refill cartridge 9 is mounted to the toner refilling portion 10 through the communicating portion 8, a driving coupler (not shown) provided in the toner refilling portion 10 is connected to the driving power input portion 94 through the power connecting opening 984. The driving power input portion 94 is rotated by receiving a rotation power from the driving coupler.

When the toner refill cartridge 9 is left for a long time, the toner inside the body member 91 may be compacted. In this state, because the fluidity of the toner is very low, even when the toner discharge port 914 is opened, the toner may not be easily discharged to the toner discharge port 914.

The toner refill cartridge 9 of the example may include the agitating member 96. The agitating member 96 is rotatably installed inside the body member 91 to agitate the toner. The agitating member 96 may include an agitating axis 961 and an agitating blade 962 extending in a radial direction from the agitating axis 961.

When the agitating member 96 is rotated, the agitating blade 962 agitates the toner inside the body member 91, which increases voids between the toner and increases the fluidity of the toner. Accordingly, when the toner discharge port 914 is opened, the toner may be easily discharged through the toner discharge port 914.

The agitating member 96 receives a rotation power from the driving power input portion 94 and agitates the toner while rotating inside the body member 91. The shutter 95 may be rotated by receiving the rotation power from the driving power input portion 94. For example, the shutter 95 and the agitating member 96 are rotated with respect to the same rotation axis. The shutter 95 and the agitating member 96 are rotated with respect to the central axis CX of the body member 91.

A rotation axis DX of the driving power input portion 94 may be positioned to be deviated in a radial direction from the central axis CX. However, a disposition of the driving power input portion 94 is not limited thereto, and the rotation axis DX of the driving power input portion 94 may be disposed coaxially with the central axis CX.

The agitating member 96 is connected to the driving power input portion 94 and rotated. As an example, a cylindrical portion 915 extending in a cylindrical shape along the central axis CX is provided at the other end 912 of the body member 91. A driving shaft 97 passes through the cylindrical portion 915 and extends into the body member 91. One end 971 of the driving shaft 97 is combined with one end 963 of the agitating axis 961. The other end 964 of the agitating axis 961 is supported by the lid 92. An axis support member 919 supporting the driving shaft 97 is provided in the cylindrical portion 915. The other end 972 of the driving shaft 97 is combined with a link member 944 on which a driven gear 943 is formed. The driven gear 943 is connected to the driving power input portion 94 and rotated.

The link member 944 is connected to the shutter 95 to rotate the shutter 95. For example, a protruding portion may be provided on the link member 944, and a concave portion in a shape complementary to the protruding portion may be provided in the shutter 95. When the protruding portion is inserted into the concave portion and the link member 944 is rotated, the shutter 95 may also be rotated.

The driving power input portion 94 is rotatably supported by the body member 91, and is exposed to the outside of the toner refill cartridge 9 through the power connecting opening 984. When the driving power input portion 94 is rotated, the agitating member 96 may also be rotated in the same direction as the rotation direction of the driving power input portion 94.

The cover 981 is combined with the body member 91. For example, the cover 981 is combined with the outer periphery of first support portions 913*a* and 913*b* of the body member 91. A locking protrusion 916 may be provided on the first support portions 913*a* and 913*b* and a locking groove 983 locked on the locking protrusion 916 may be provided in the cover 981. The above-described communicator 99 is provided in the cover 981.

With the above configuration, in the toner refill cartridge 9, when the driving power input portion 94 receives the driving power from the outside and rotates, the shutter 95 receiving the rotation power from the driving power input portion 94 rotates and changes from the closing position to the opening position, and the toner discharge port 914 is opened. The agitating member 96 receives the rotation power from the driving power input portion 94 and rotates to agitate the toner contained in the body member 91. Accordingly, the toner is discharged through the opened toner discharge port 914. As described above, the toner refill cartridge 9 automatically discharges the toner by receiving power from the outside through the driving power input portion 94.

However, it is difficult to know whether the toner has been completely discharged from the toner refill cartridge 9 that automatically discharges the toner, unlike with a toner refill cartridge 9 that manually discharges the toner by a user. An external shape of the toner refill cartridge that manually discharges the toner, for example, a syringe-type toner refill cartridge, changes due to a plunger pressed by the user, and accordingly, the user may easily know whether the toner has been completely discharged by identifying a change in the external shape of the toner refill cartridge. On the hand, even when the toner has been completely discharged from the toner refill cartridge 9 that automatically discharges the toner, because the external shape of the toner refill cartridge 9 does not change, the user may not easily identify whether the toner has been completely discharged.

To address the above issue, the toner refill cartridge 9 according to some examples further includes the discharge completion display module 100.

Figure 5:
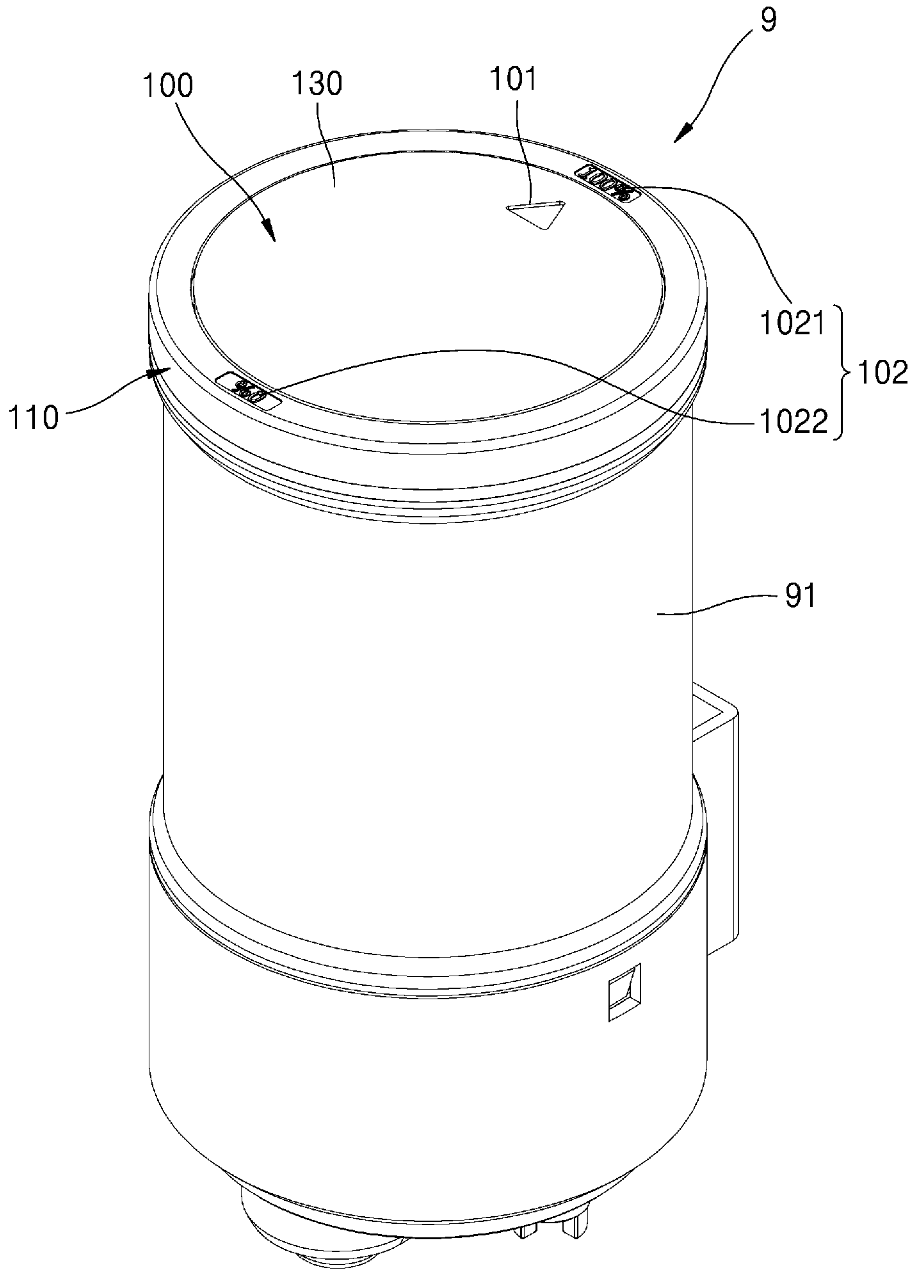
FIG. 5 is a perspective view of a toner refill cartridge including a discharge completion display module, according to an example.

The discharge completion display module 100 may indicate whether the toner contained in the body member 91 has been completely discharged. As shown in FIG. 5, the discharge completion display module 100 includes a moving display portion 101 that receives the rotation power from the driving power input portion 94 to move a position of the moving display portion 101, and a fixed display portion 102 whose position is fixed with respect to the body member 91. Whether the toner contained in the body member 91 has been completely discharged may be indicated through a position relationship of the moving display portion 101 with respect to the fixed display portion 102. Hereinafter, an example of the discharge completion display module 100 is described.

Figure 6:
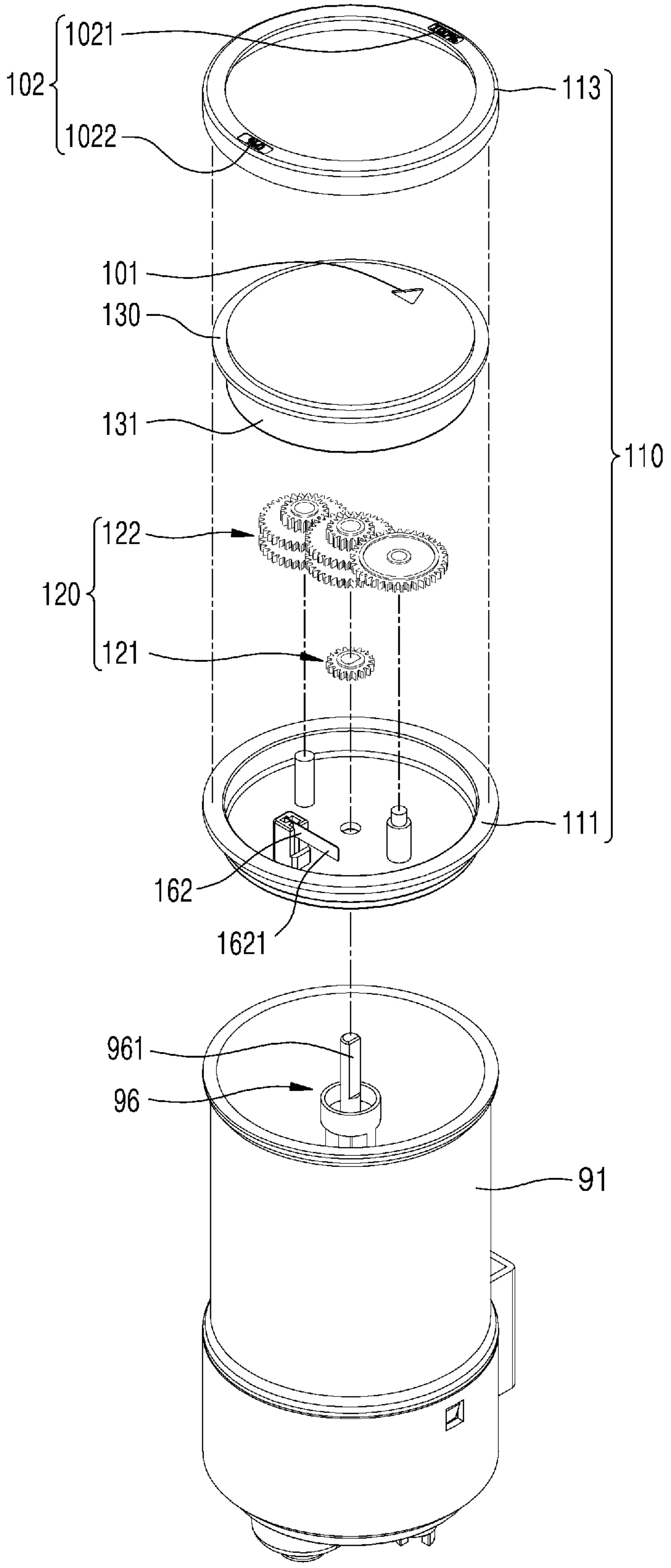
FIG. 6 is an exploded perspective view illustrating an example of the discharge completion display module shown in FIG. 5.
Figure 7:
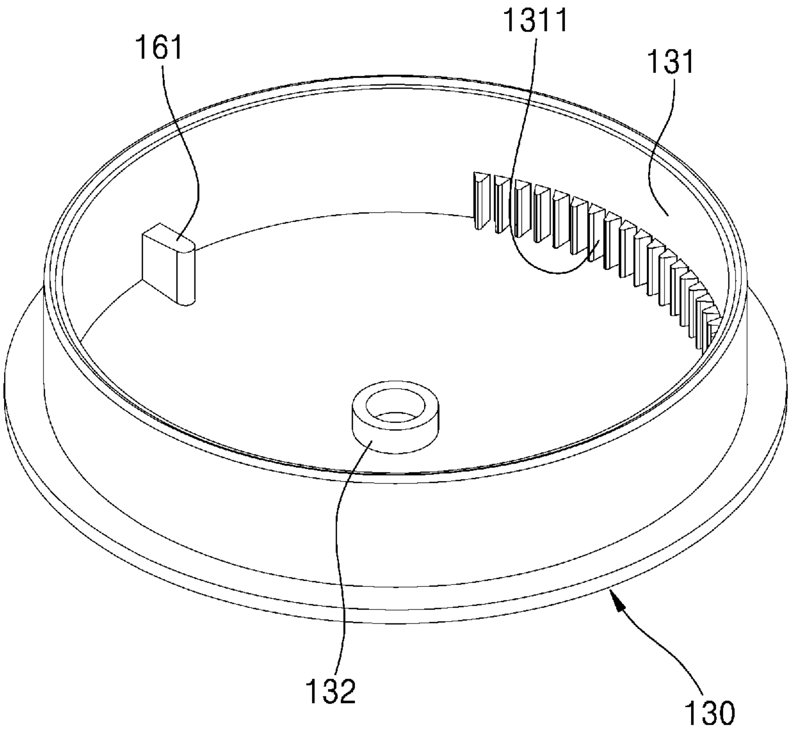
FIG. 7 is a perspective view of a lid rotating plate of FIG. 6 viewed from another angle.
Figure 8:
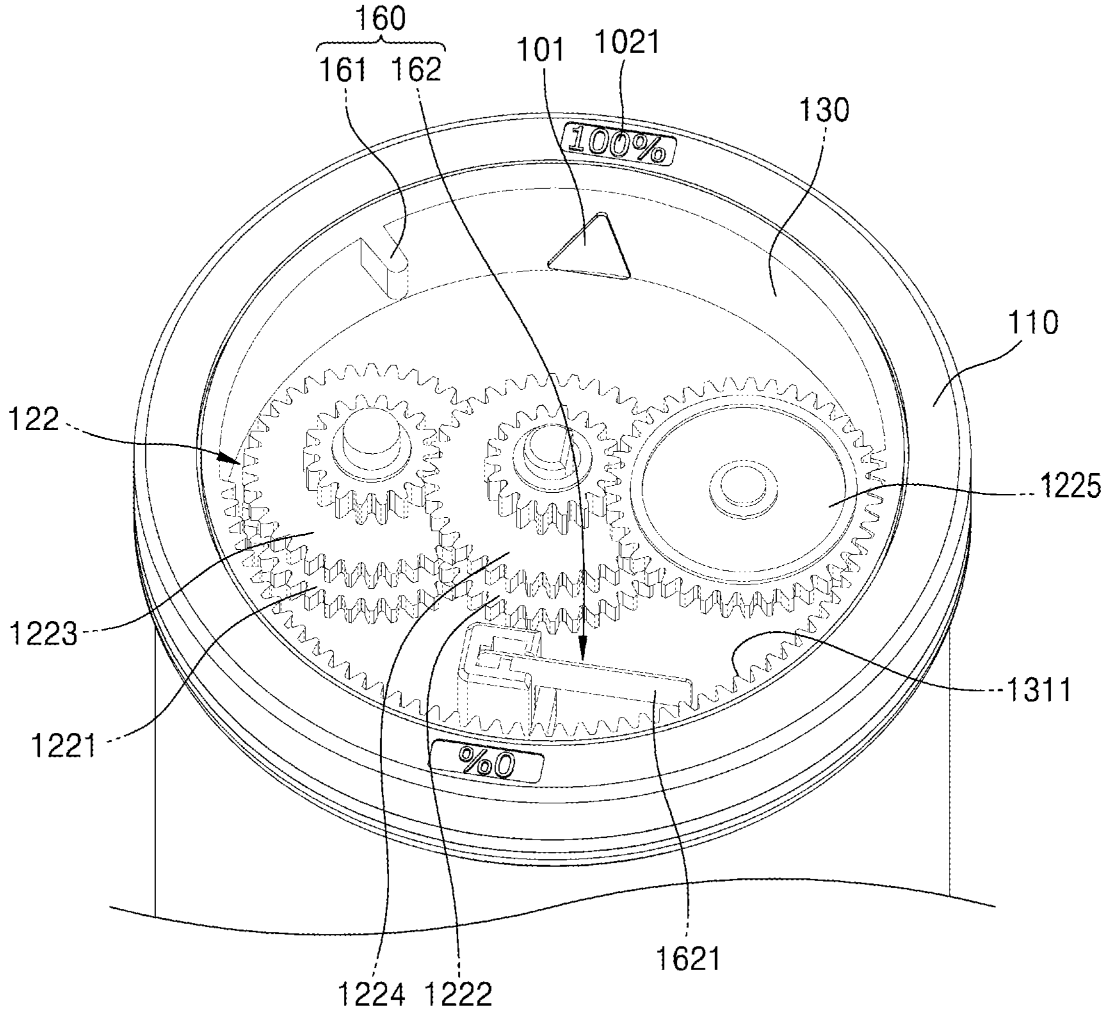
FIG. 8 is an enlarged perspective view of a part of a toner refill cartridge according to an example.
Figure 9:
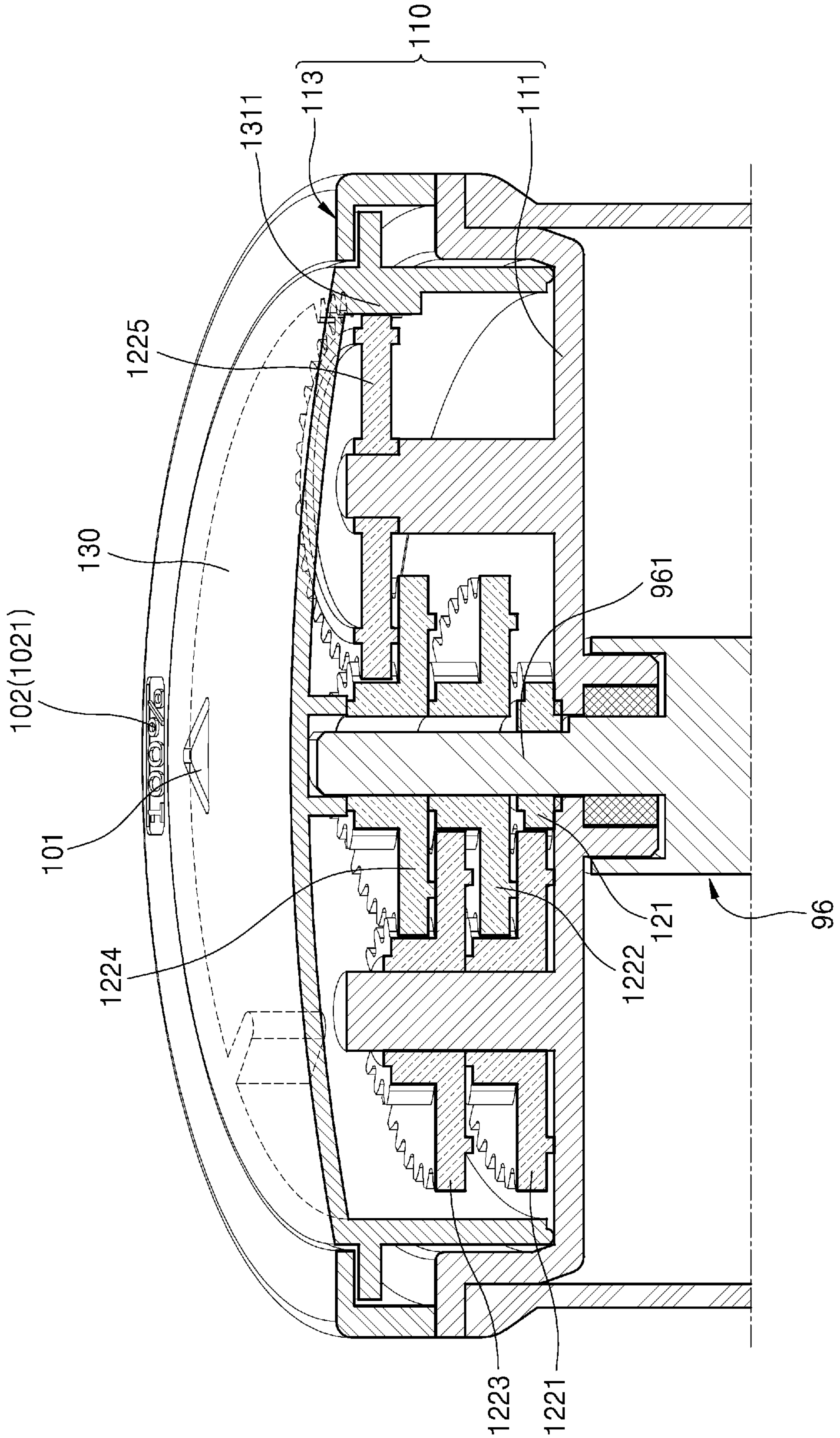
FIG. 9 is a cross-sectional perspective view of a part of FIG. 8.

FIG. 5 is a perspective view illustrating the toner refill cartridge 9 including the discharge completion display module 100 according to an example, and FIG. 6 is an exploded perspective view illustrating an example of the discharge completion display module 100 shown in FIG. 5. FIG. 7 is a perspective view of a lid rotating plate 130 of FIG. 6 viewed from another angle. FIG. 8 is an enlarged perspective view of a part of the toner refill cartridge 9 according to an example, and FIG. 9 is a cross-sectional perspective view of a part of FIG. 8.

Referring to FIGS. 5 and 6, in the toner refill cartridge 9 according to an example, the discharge completion display module 100 may be disposed at one end of the body member 91. For example, the discharge completion display module 100 may perform a function as the lid 92.

The discharge completion display module 100 may be configured to receive a rotation power from the driving power input portion 94 through the agitating member 96. The discharge completion display module 100 includes a lid base 110 combined with an end of the body member 91, and the lid rotating plate 130 rotatably combined with the lid base 110.

The lid base 110 is fixed to the body member 91. The lid base 110 may include a lid fixing portion 111 and a lid rim portion 113. The lid fixing portion 111 covers one end of the body member 91. The lid rim portion 113 is fixed to the lid fixing portion 111 and surrounds the rim of the lid rotating plate 130. The lid fixing portion 111 and the lid rim portion 113 may be separate from one another. Alternatively, the lid fixing portion 111 and the lid rim portion may be integrated with one another.

The fixed display portion 102 may be provided on the lid base 110. The fixed display portion 102 may be provided on the lid rim portion 113. The fixed display portion 102 is provided on the lid rim portion 113 having a fixed position with respect to the body member 91, so that the position of the fixed display portion 102 may be fixed unlike the moving display portion 101.

The fixed display portion 102 may include a first information display 1021 displaying a state before the toner is discharged from the toner refill cartridge 9 and a second information display 1022 displaying a state in which the toner has been completely discharged from the toner refill cartridge 9. The first information display 1021 may display, for example, information indicating that the body member 91 is full of the toner. For example, the first information display 1021 may be displayed as "100%", but is not limited thereto, and may be displayed in various ways, such as "before toner supply". The second information display 1022 may display, for example, information indicating that no toner remains in the body member 91. For example, the second information display 1022 may be displayed as "0%", but is not limited thereto, and may be displayed in various ways, such as "toner supply complete".

Referring to FIGS. 6 and 7, the lid rotating plate 130 may include a support portion 131 protruding in a cylindrical shape so as to be inserted into the lid fixing portion 111. The moving display portion 101 is provided on an upper surface of the lid rotating plate 130. A cylindrical portion 132 having a cylindrical shape that rotatably supports the end 964 of the agitating axis 961 may be provided on a lower surface of the cylindrical portion 132. The end 964 of the agitating axis 961 may pass through the lid base 110 and be supported by the cylindrical portion 132.

Referring to FIG. 6, the moving display portion 101 may include an indicator indicating the fixed display portion 102. For example, the moving display portion 101 may indicate the first information display 1021 or the second information display 1022 according to a rotation angle of the lid rotating plate 130. Whether the toner has been completely discharged may be indicated through a position relationship of the moving display portion 101 with respect to the fixed display portion 102. For example, when the moving display portion 101 is at a position corresponding to the first information display 1021, the moving display portion 101 may indicate a state before the toner is discharged. For example, when the moving display portion 101 is at a position corresponding to the second information display 1022, the moving display portion 101 may indicate a state in which the toner has been completely discharged.

Referring to FIGS. 6 to 9, the lid base 110 may include a gear assembly 120 rotating the lid rotating plate 130 by receiving power from the agitating axis 961 of the agitating member 96. An internally toothed gear 1311 rotated by the gear assembly 120 may be provided on an inner circumferential surface of the support portion 131 of the lid rotating plate 130.

The gear assembly 120 may include a connecting gear 121 connected to the agitating axis 961 of the agitating member 96, and at least one reduction gear 122 connected between the connecting gear 121 and the internally toothed gear 1311. The reduction gear 122 may be configured such that a rotation speed of the internally toothed gear 1311 is slower than a rotation speed of the connecting gear 121. While the agitating axis 961 of the agitating member 96 rotates several tens to hundreds of times to discharge the toner, the internally toothed gear 1311 may rotate within a certain angular range without rotating even once. For example, the internally toothed gear 1311 may be rotated by 360 degrees or less while the agitating axis 961 rotates several tens of times. For example, the internally toothed gear 1311 and the lid rotating plate 130 including the internally toothed gear 1311 may be rotated by 180 degrees or less while the agitating axis 961 rotates several tens of times. Accordingly, the moving display portion 101 provided on the lid rotating plate 130 may be rotated by 180 degrees or less while the agitating axis 961 rotates several tens of times.

There may be a plurality of reduction gears 122 (e.g., 1221, 1222, 1223, 1224, 1225 shown in FIG. 8) to achieve a reduction ratio. The plurality of reduction gears 122 may constitute a gear train. For example, some reduction gears 1222 and 1224 are installed to be idly rotatable on the agitating axis 961, and other reduction gears 1221 and 1223 are installed to be idly rotatable on another rotation axis spaced apart from the agitating axis 961. The plurality of reduction gears 122 constituting the gear train may be connected to the internally toothed gear 1311 by another connecting gear 1225. However, a connection structure of the reduction gear 122 and the internally toothed gear 1311 is not limited thereto, and one of the plurality of reduction gears 122 may be directly connected to the internally toothed gear 1311.

With the configuration shown, the rotation power of the agitating axis 961 is transmitted to the connecting gear 121, and the rotation power of the connecting gear 121 is transmitted to the internally toothed gear 1311 through the first reduction gear 1221, the second reduction gear 1222, the third reduction gear 1223, the fourth reduction gear 1224, and the other connecting gear 1225.

The reduction ratio by the plurality of reduction gears 122 may be 1:10 to 1:400. The reduction ratio by the plurality of reduction gears 122 may be 1:40 to 1:200. As described above, when the reduction ratio is high, it is difficult to arbitrarily rotate the lid rotating plate 130 from the outside. Accordingly, when the toner has been completely discharged from the toner refill cartridge 9, it is possible to prevent the toner refill cartridge 9 from returning to the state before the toner is discharged by arbitrarily manipulating the discharge completion display module 100.

The discharge completion display module 100 according to an example may further include a sound generating portion 160 that operates by receiving the rotation power from the driving power input portion 94. The sound generating portion 160 generates a sound when the moving display portion 101 reaches a position corresponding to the fixed display portion 102. Through generation of the sound, it is possible to audibly inform the user that the toner has been completely discharged.

The sound generating portion 160 may include a sound inducing protrusion 161 disposed on the lid rotating plate 130 that rotates, and a sound member 162 fixedly installed on the lid base 110. The sound member 162 has a cantilever shape, and when a free end 1621 vibrates, sound may be generated. During the rotation of the lid rotating plate 130, the sound inducing protrusion 161 may come into contact with the free end 1621 of the sound member 162, and when the contact is released, sound may be generated.

Figure 10:
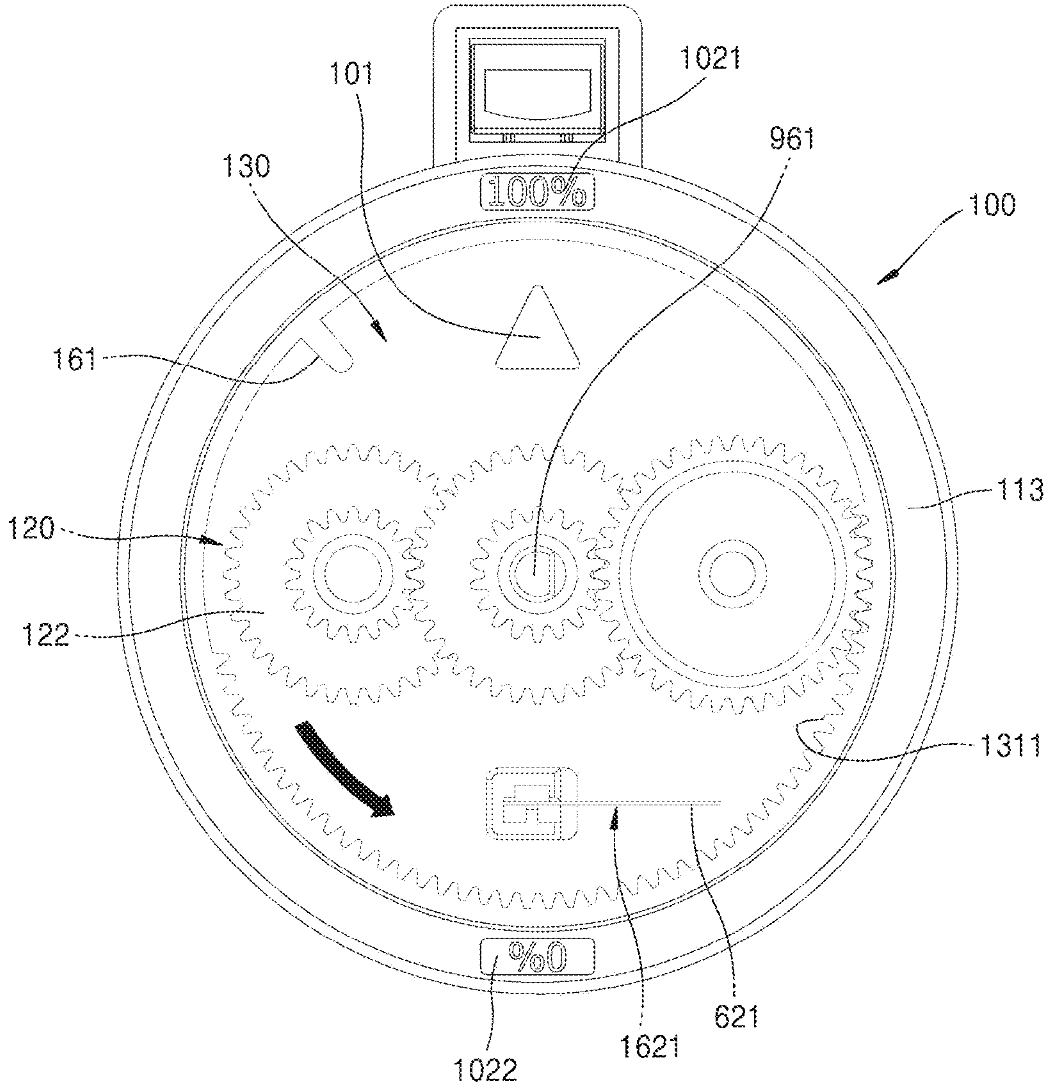
FIGS. 10 and 11 are diagrams illustrating operations of a discharge completion display module, according to an example, where
Figure 11:
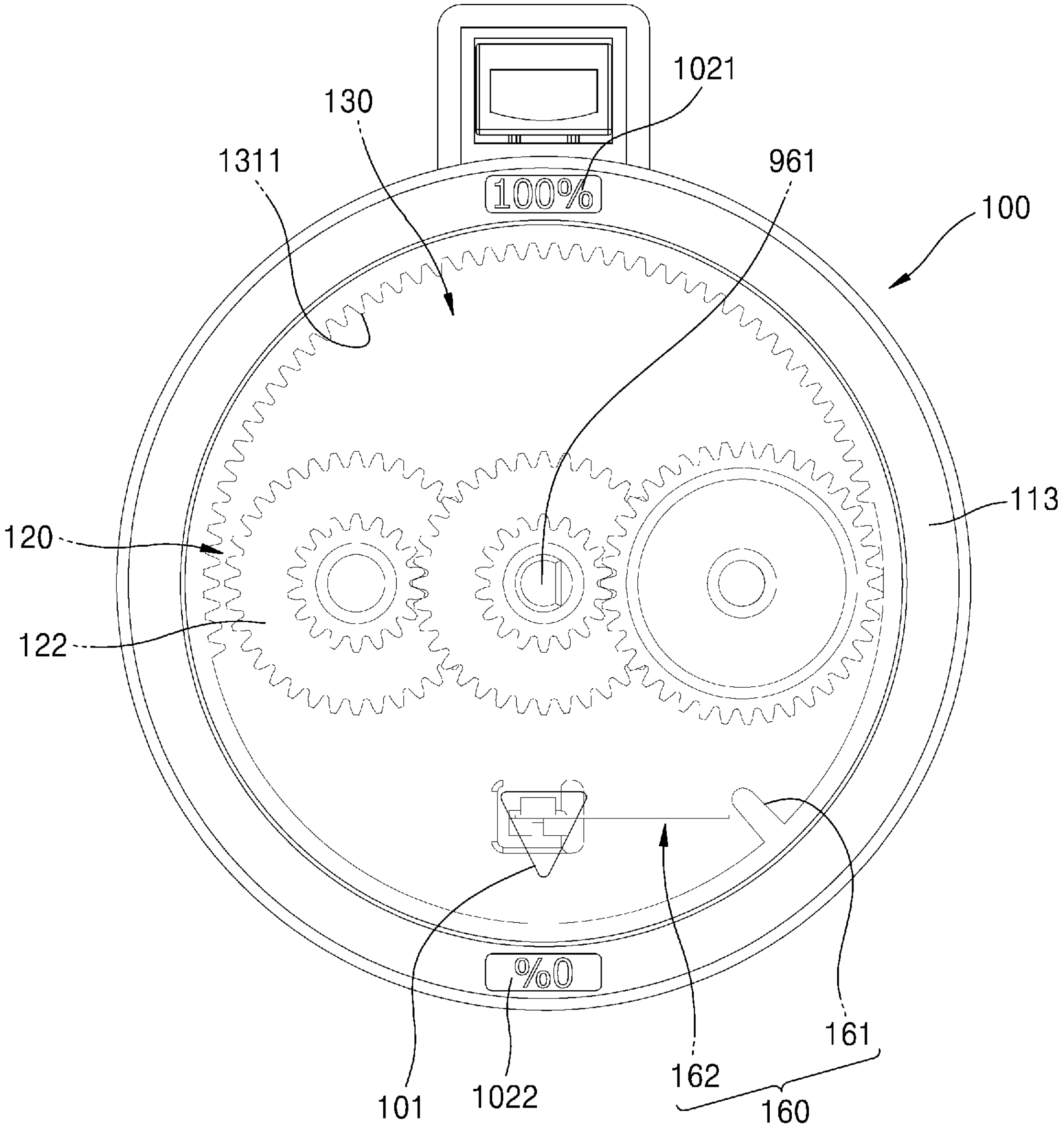

FIGS. 10 and 11 are diagrams illustrating operations of the discharge completion display module 100 according to an example. FIG. 10 shows the discharge completion display module 100 in a state before a toner is discharged, and FIG. 11 shows the discharge completion display module 100 in a state in which the toner has been completely discharged.

Referring to FIG. 10, the moving display portion 101 formed on the lid rotating plate 130 in the discharge completion display module 100 corresponds to the first information display 1021 of the fixed display portion 102 provided on the lid rim portion 113.

In this state, as shown in FIGS. 1 and 3, the toner refill cartridge 9 is connected to the toner refilling portion 10. The communicator 99 is electrically connected to the main body 1 when the toner refill cartridge 9 is mounted on the toner refilling portion 10. The communicator 99 may perform functions such as indicating whether the toner refill cartridge 9 is mounted on the toner refilling portion 10, and transmission of information of the toner refill cartridge 9. For example, the communicator 99 transmits the fact that the toner refill cartridge 9 is installed and toner capacity information of the toner refill cartridge 9 to the main body 1.

The main body 1 may determine the number of rotations of the driving power input portion 94 based on the toner capacity information of the toner refill cartridge 9. The main body 1 provides a relatively small number of rotations when the toner capacity of the mounted toner refill cartridge 9 is low, and provides a relatively large number of rotations when the toner capacity of the mounted toner refill cartridge 9 is high. The number of rotations of the driving power input portion 94 provided by the main body 1 may be experimentally verified in advance so that the toner of the toner refill cartridge 9 may be sufficiently discharged. The driving power input portion 94 receives a rotation power from the main body 1 and rotates by the determined number of rotations.

Referring to FIGS. 4 and 10, as the driving power input portion 94 rotates, the agitating axis 961 of the agitating member 96 rotates. The number of rotations of the agitating member 96 may correspond to the number of rotations of the driving power input portion 94. The agitating axis 961 of the agitating member 96 transmits a rotation power of the driving power input portion 94 to the gear assembly 120. The gear assembly 120 rotates by receiving the rotation power of the driving power input portion 94.

Referring to FIGS. 9 and 10, the connecting gear 121 of the gear assembly 120 rotates at the same rotation speed as the agitating axis 961. The rotation power of the connecting gear 121 is transmitted to the internally toothed gear 1311 of the lid rotating plate 130 through the reduction gear 122, which causes the rotation speed of the internally toothed gear 1311 to be slower than the rotation speed of the connecting gear 121. Accordingly, the lid rotating plate 130 rotates in one direction, for example, counterclockwise, at a rotation speed slower than the rotation speed of the agitating member 96. By the rotation of the lid rotating plate 130, the moving display portion 101 and the sound inducing protrusion 161 rotate and move.

Referring to FIG. 11, the moving display portion 101 rotates and moves from a position corresponding to the first information display 1021 to a position corresponding to the second information display 1022. The user may see that the moving display portion 101 indicates the position corresponding to the second information display 1022 and easily identify visually the state in which the toner in the toner refill cartridge 9 has been completely discharged.

In addition, the user may easily identify audibly the state in which the toner of the toner refill cartridge 9 has been completely discharged, by the sound generating portion 160 operated by receiving the rotation power from the driving power input portion 94.

Figure 12:
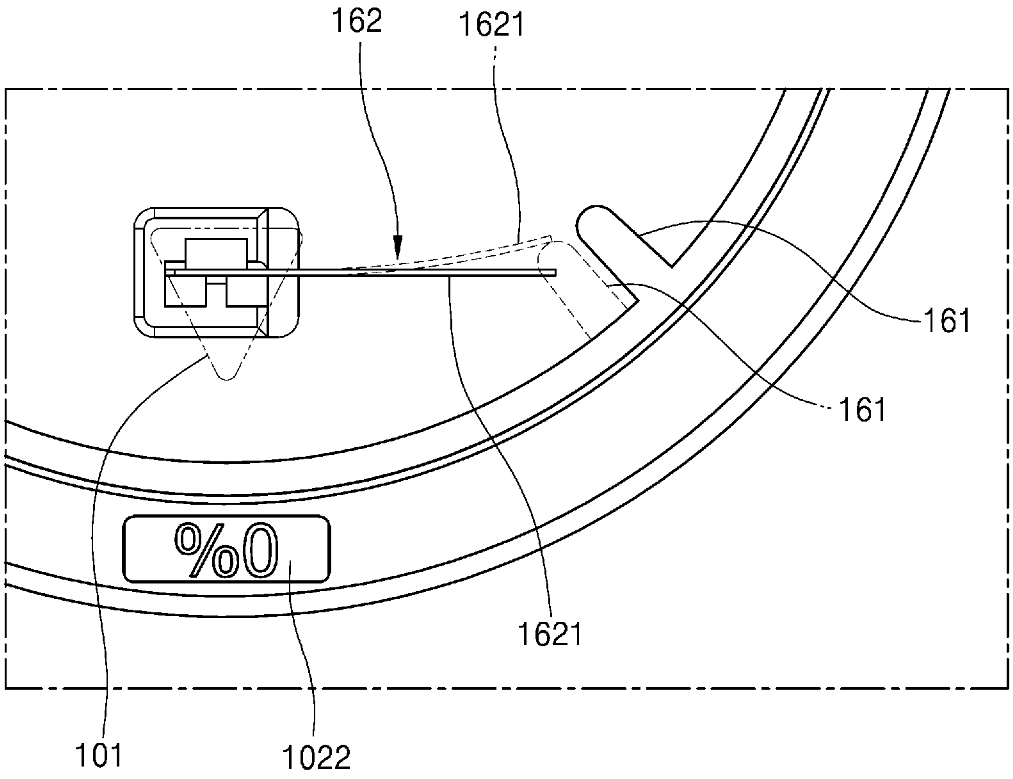
FIG. 12 is a diagram illustrating an operation of a sound generating portion of FIG. 11.

FIG. 12 is a diagram illustrating an operation of the sound generating portion 160 of FIG. 11. Referring to FIGS. 11 and 12, as the lid rotating plate 130 rotates due to receiving a rotation power from the driving power input portion 94, the sound inducing protrusion 161 disposed on the lid rotating plate 130 rotates. The sound inducing protrusion 161 that rotates comes into contact with the sound member 162. Because the moving display portion 101 corresponds to or is adjacent to the second information display 1022, the sound member 162 and the sound inducing protrusion 161 are released from contact so that the sound member 162 vibrates to generate sound. In the above-described example, the sound inducing protrusion 161 and the sound member 162 are part of some examples of the configuration of the sound generating portion 160, but the disclosure is not limited thereto, and any configuration for generating sound when the moving display portion 101 corresponds to or is adjacent to the second information display 1022 may be used.

Figure 13:
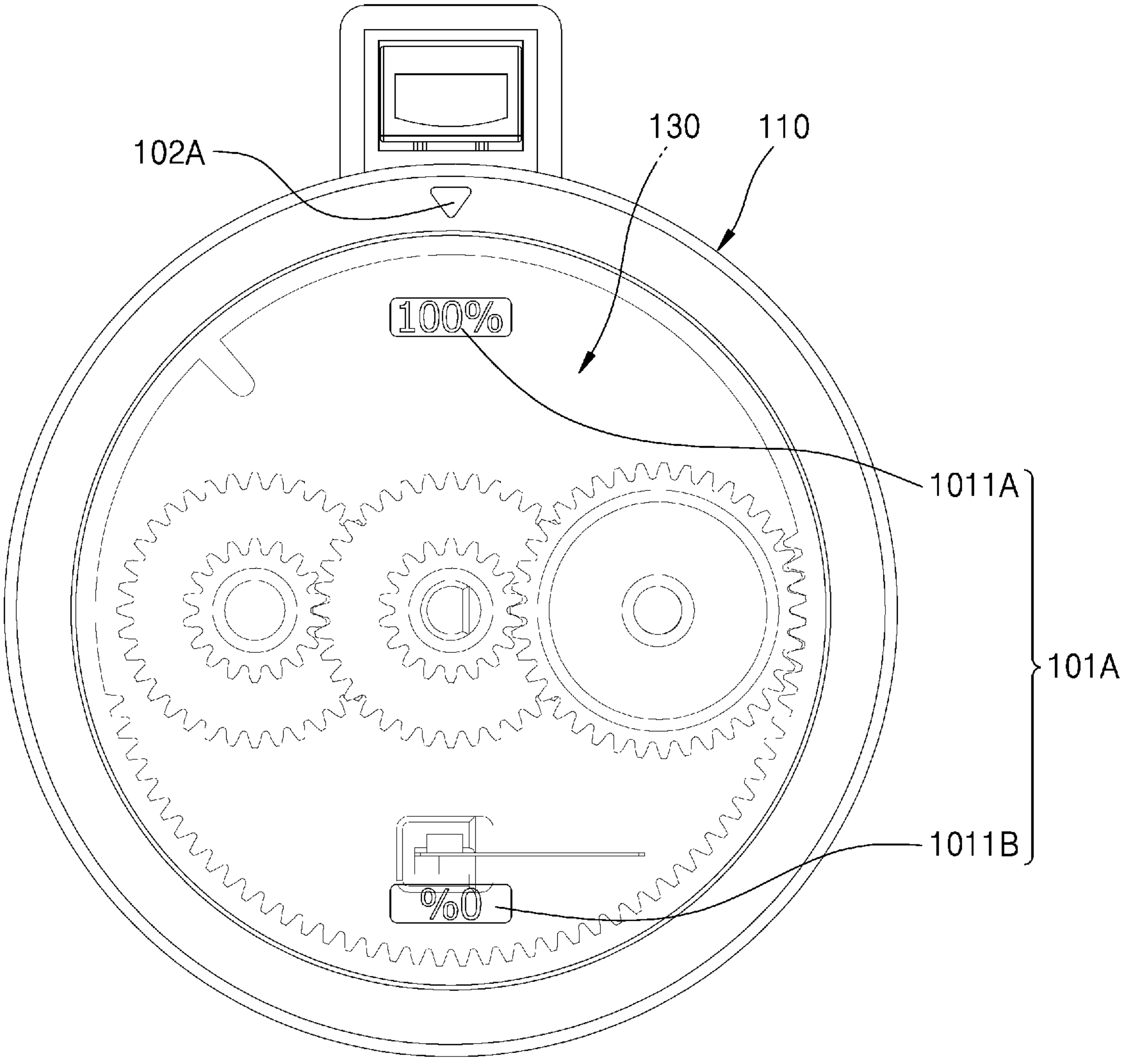
FIG. 13 is a diagram illustrating dispositions of a moving display portion and a fixed display portion, according to another example.

In the above-described example, the moving display portion 101 is an indicator and the fixed display portion 102 includes the first and second information displays 1021 and 1022. In other examples, as shown in FIG. 13, a moving display portion 101A may include first and second information displays 1011A and 1011B, and a fixed display portion 102A may be an indicator.

In examples discussed above, the moving display portions 101 and 101A move continuously at a constant rotation speed. However, the moving display portions 101 and 101A may move in different ways. For example, the rotation speed of the moving display portions 101 and 101A may not be constant or may be discontinuous, or the movement may be straight movement rather than rotation movement.

Figure 14A:
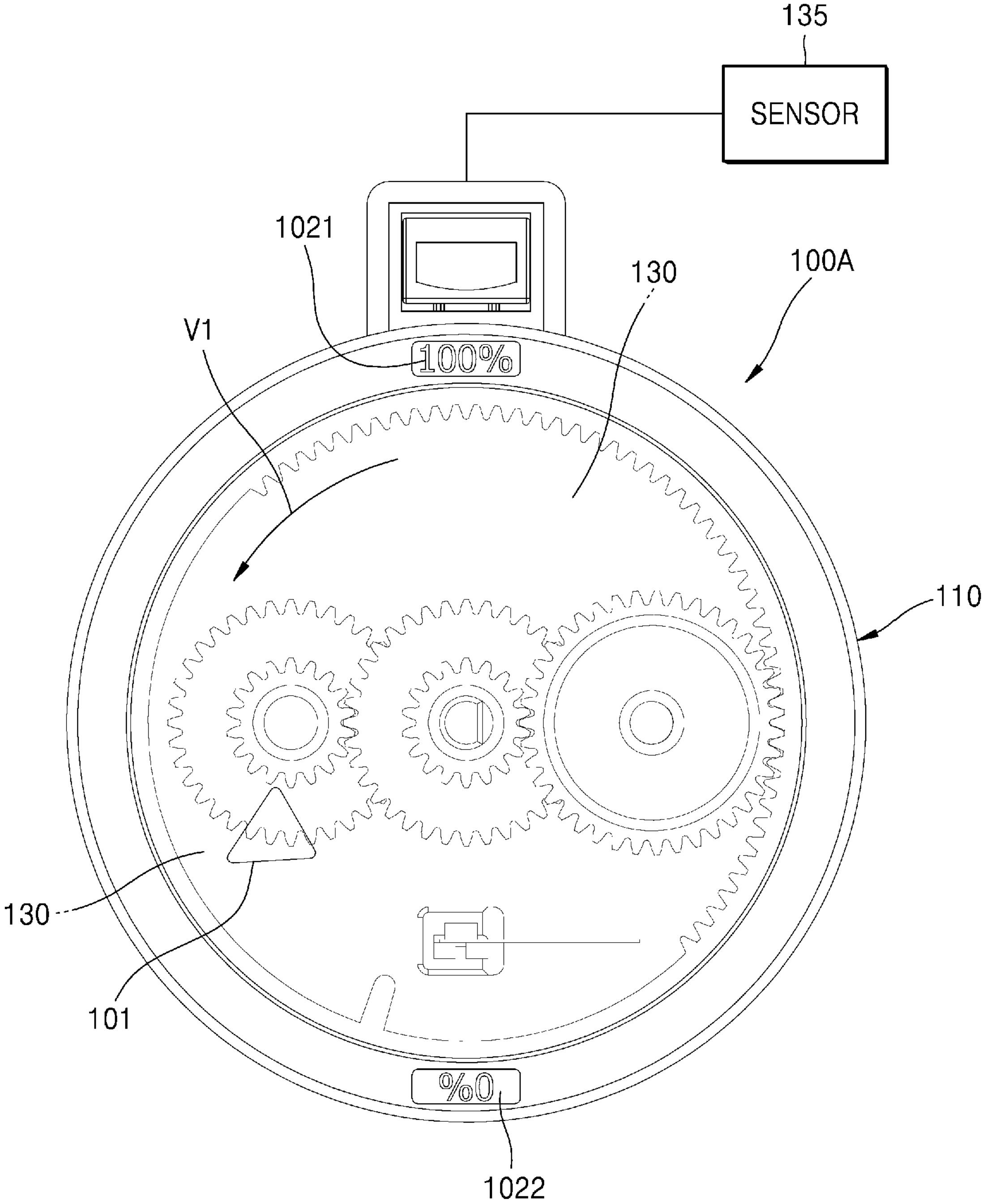
FIGS. 14A and 14B are diagrams illustrating an operation of a moving display portion in a discharge completion display module, according to another example.
Figure 14B:
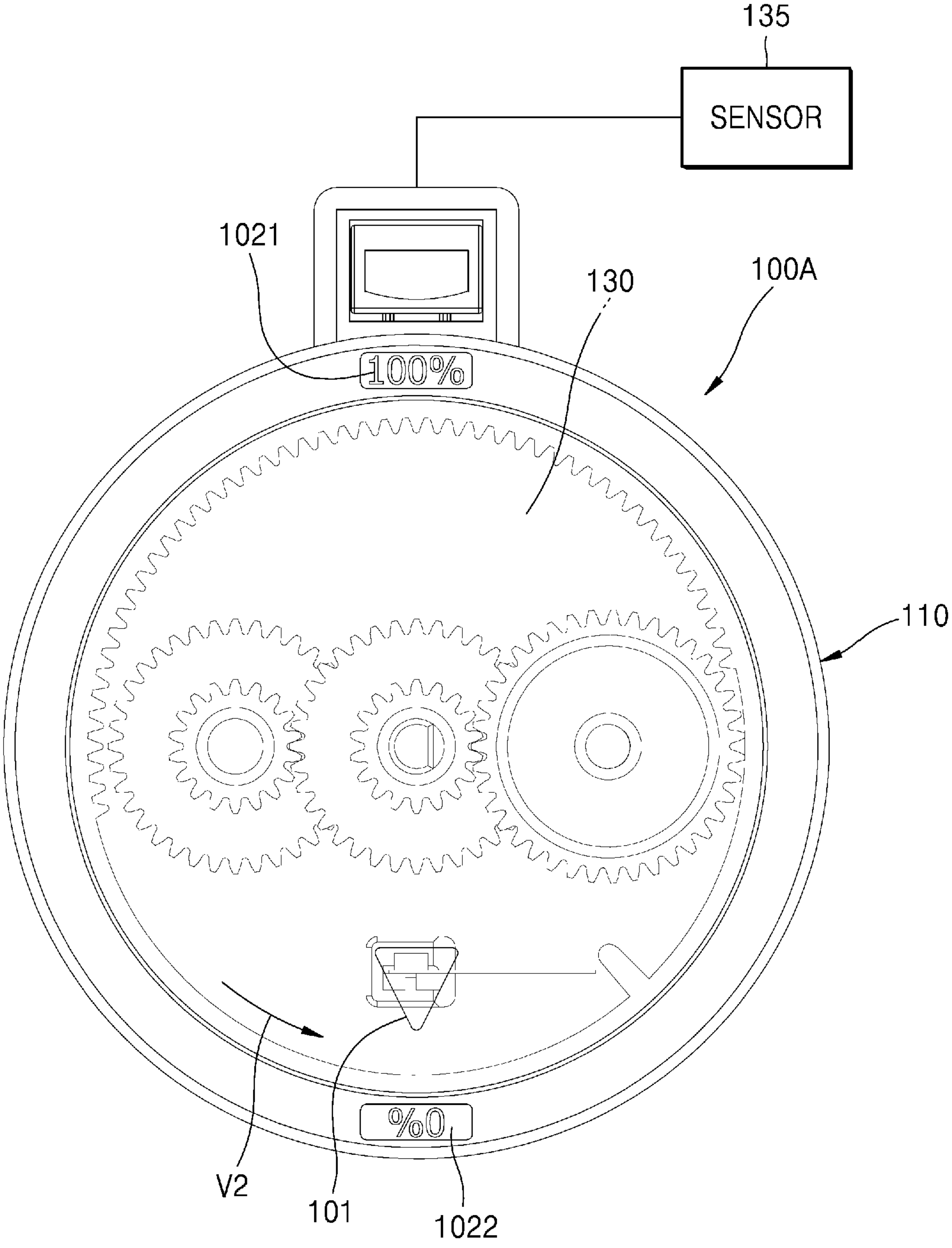

FIGS. 14A and 14B are diagrams illustrating an operation of the moving display portion 101 in a discharge completion display module 100A according to another example. Referring to FIGS. 14A and 14B, a rotation speed of the moving display portion 101 may vary. This may be useful in a case where a toner inside the toner refill cartridge 9 has been completely discharged before the moving display portion 101 starts from a position corresponding to the first information display 1021 and reaches a position corresponding to the second information display 1022.

For example, the moving display portion 101 moves to the position corresponding to the second information display 1022 when the driving power input portion 94 (see FIG. 4) and the agitating member 96 (see FIG. 4) rotate by a previously determined number of rotations. However, when the driving power input portion 94 and the agitating member 96 are rotated less than the determined number of rotations and thus the moving display portion 101 has not yet reached the position corresponding to the second information display 1022, there may be a case where the toner inside the toner refill cartridge 9 has been completely discharged. To address this case, the rotation speed of the moving display portion 101 may increase after the toner has been completely discharged. In other words, the moving display portion 101 may rotate and move at a first rotation speed V1 before the toner has been completely discharged, and rotate and move at a second rotation speed V2 that is faster than the first rotation speed V1 after the toner has been completely discharged. Accordingly, it is possible to reduce a time taken for a user to detect that the toner has been completely discharged.

As an example in this regard, a sensor 135 sensing whether the toner of the toner refill cartridge 9 has been completely discharged may be disposed in the toner refill cartridge 9 or the developing cartridge 2. For example, the sensor 135 may be configured to determine whether the toner is present near the toner discharge port 914. For example, the sensor 135 is disposed near the toner discharge port 914 in the toner refill cartridge 9, and may include two terminals (not shown) to sense capacitance. The capacitance between the terminals may vary depending on an amount of the toner. When the toner of the toner refill cartridge 9 has been entirely discharged, the toner runs out between the two terminals and the capacitance drops below a reference value. In this manner, the sensor 135 may sense whether the toner of the toner refill cartridge 9 has been completely discharged.

Based on information sensed by the sensor 135, the rotation speed of the moving display portion 101 may be controlled. For example, as shown in FIG. 14A, when the information sensed through the sensor 135 is in a state before the toner of the toner refill cartridge 9 has been completely discharged, the driving power input portion 94 may be rotated at a determined rotation speed, and the moving display portion 101 connected to the driving power input portion 94 may be rotated at the first rotation speed V1. As shown in FIG. 14B, when the information sensed through the sensor 135 indicates that the toner of the toner refill cartridge 9 has been completely discharged, the driving power input portion 94 may be rotated at a speed higher than the determined rotation speed, and the moving display portion 101 connected to the driving power input portion 94 may be rotated at the second rotation speed V2 that is faster than the first rotation speed V1.

Figure 15:
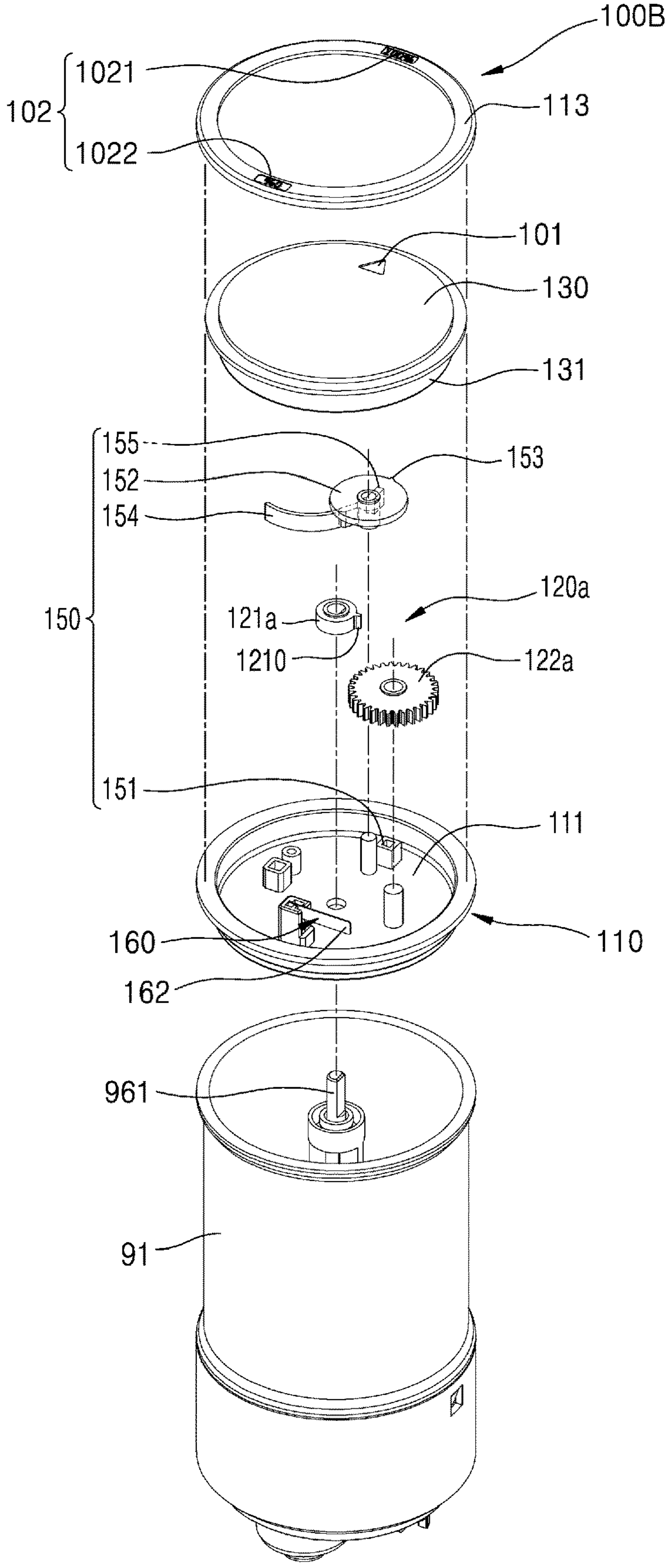
FIG. 15 is a perspective view illustrating a toner refill cartridge including a discharge completion display module, according to another example.
Figure 16:
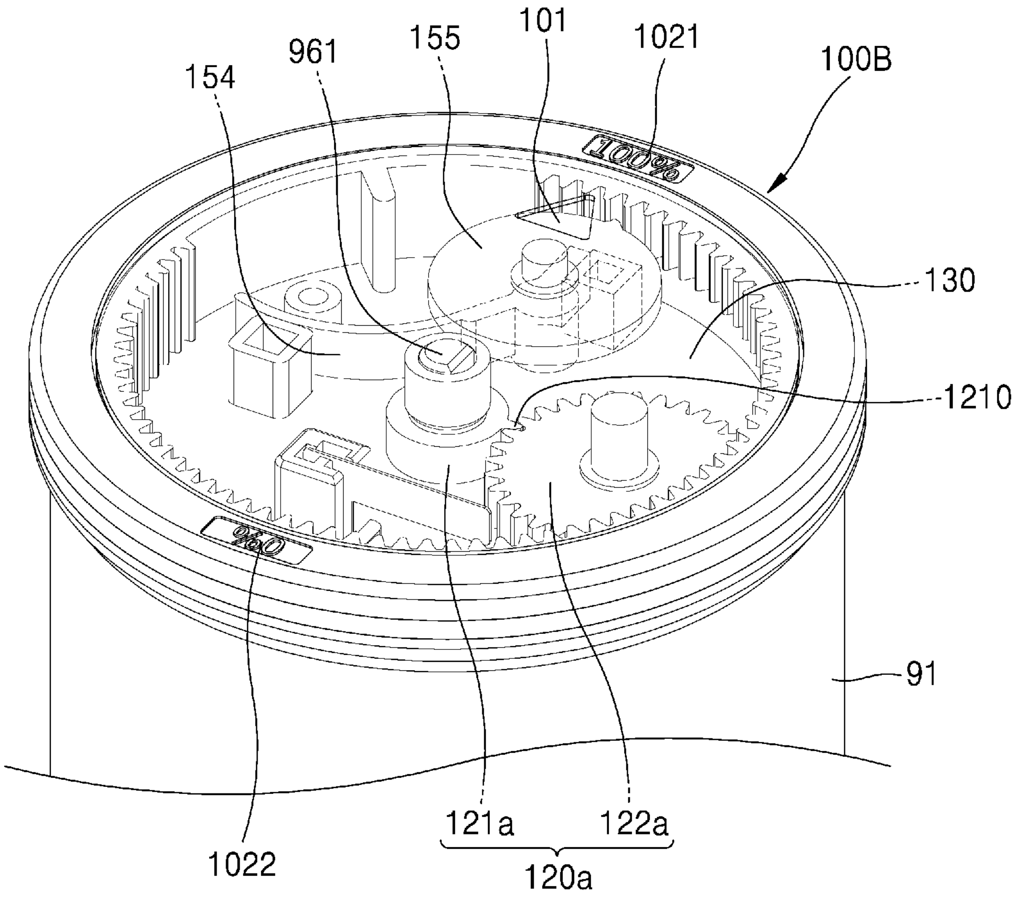
FIG. 16 is an enlarged perspective view of the discharge completion display module of FIG. 15.
Figure 17:
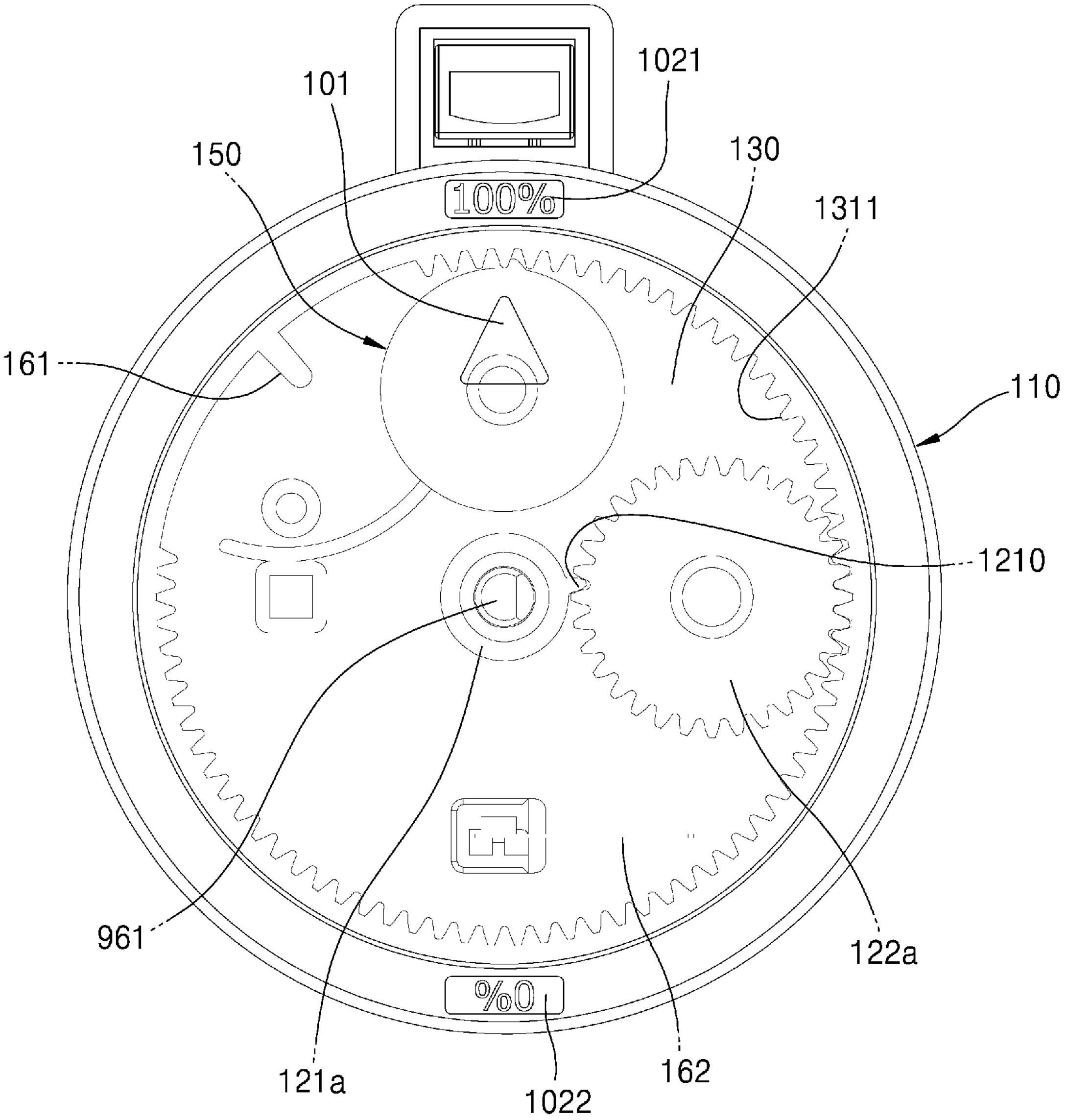
FIGS. 17 and 18 are diagrams illustrating operations of the discharge completion display module, according to a further example.
Figure 18:
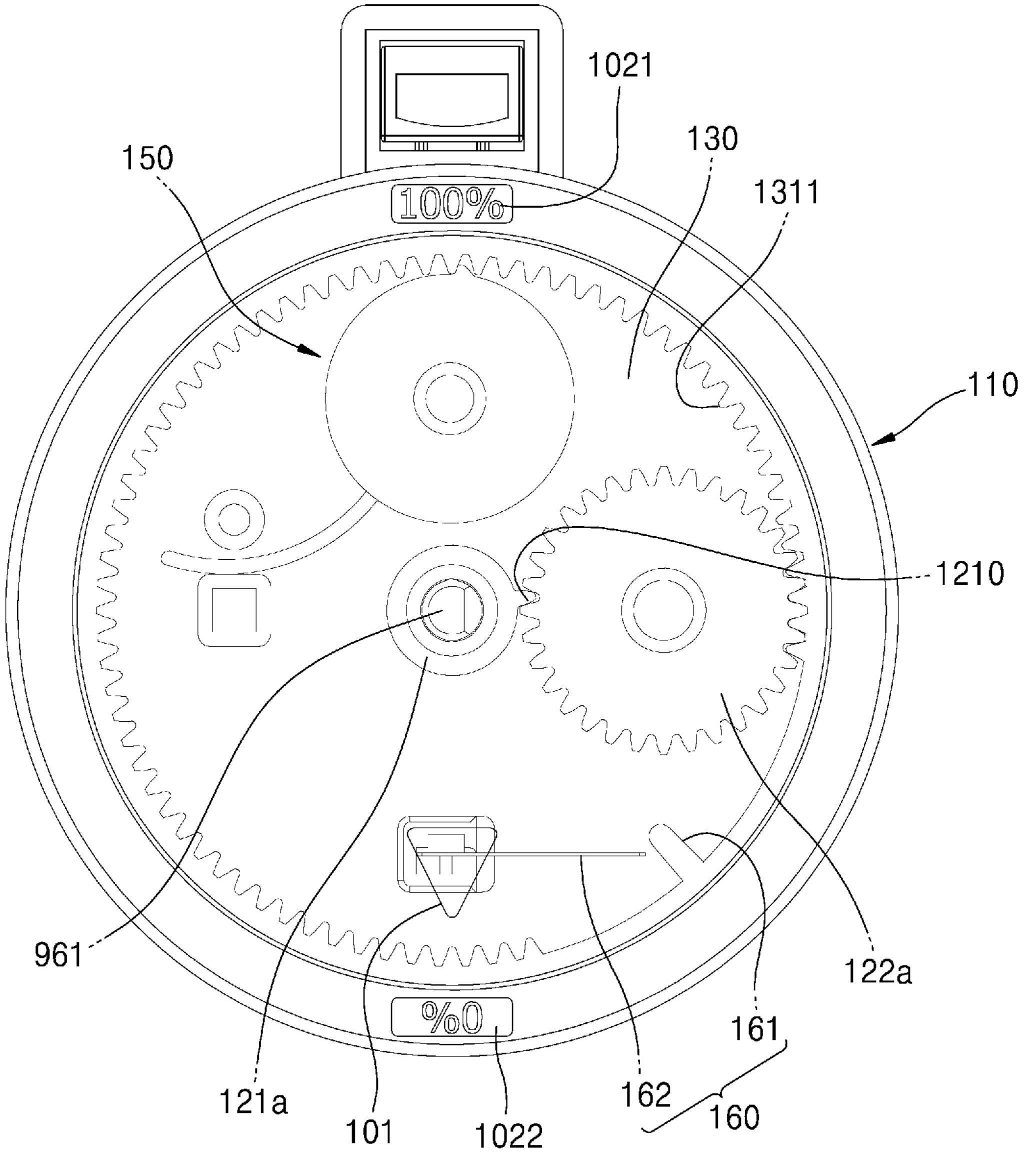

FIG. 15 is a perspective view illustrating the toner refill cartridge 9 including a discharge completion display module 100B according to another example. FIG. 16 is an enlarged perspective view of the discharge completion display module 100B of FIG. 15. FIGS. 17 and 18 are diagrams illustrating operations of the discharge completion display module 100B.

Referring to FIGS. 15 and 16, the discharge completion display module 100B according to an example includes the lid base 110 provided with the fixed display portion 102 and the lid rotating plate 130 provided with the moving display portion 101. The lid base 110 includes a gear assembly 120*a* rotating the lid rotating plate 130 by receiving power from the agitating axis 961 of the agitating member 96. The gear assembly 120*a* includes a first connecting gear 121*a* connected to the agitating axis 961 and a second connecting gear 122*a* connecting between the first connecting gear 121*a* and the internally toothed gear 1311. Redundant descriptions of the same elements as those in the above-described examples are omitted, and differences therebetween are mainly described below.

In the discharge completion display module 100B according to an example, the configuration of the gear assembly 120*a* reducing a rotation speed of the lid rotating plate 130 may be changed. For example, a partial gear may be used as the first connecting gear 121*a*. In other words, the first connecting gear 121*a* may be a partial gear in which teeth 1210 are partially formed on the outer circumferential surface. The teeth 1210 of the first connecting gear 121*a* may be singular.

Referring to FIGS. 17 and 18, as the partial gear is used as the first connecting gear 121*a*, the rotation speed of the lid rotating plate 130 may be reduced without using the plurality of reduction gears 122. For example, the second connecting gear 122*a* is installed to be idly rotatable with respect to a rotating axis spaced apart from the agitating axis 961, and is rotated in response to engagement with the first connecting gear 121*a*. The second connecting gear 122*a* may be singular. The second connecting gear 122*a* is engaged with the teeth 1210 of the first connecting gear 121*a* to selectively rotate. For example, the second connecting gear 122*a* is selectively rotated when the teeth 1210 of the first connecting gear 121*a* are engaged with the second connecting gear 122*a*, and the second connecting gear 122*a* is not rotated when the teeth 1210 of the first connecting gear 121*a* are not engaged with the second connecting gear 122*a*. The first connecting gear 121*a* rotates continuously, while the second connecting gear 122*a* rotates discontinuously. The internally toothed gear 1311 rotating in engagement with the second connecting gear 122*a* and the lid rotating plate 130 provided with the internally toothed gear 1311 also rotate discontinuously. By rotation of the lid rotating plate 130, the moving display portion 101 moves from a position facing the first information display 1021 to a position facing the second information display 1022.

In the discharge completion display module 100B according to an example, because a connection structure between the first connecting gear 121*a* and the internally toothed gear 1311 is simple, when there is no additional element, the lid rotating plate 130 may be easily manipulated by an external power.

Referring to FIGS. 15 and 16 again, to address the above issue, the discharge completion display module 100B according to an example may further include a reverse rotation preventing portion 150 blocking a reverse rotation of the lid rotating plate 130. The reverse rotation preventing portion 150 is installed on the lid base 110, and may allow a forward rotation of the internally toothed gear 1311, and block the reverse rotation thereof.

The reverse rotation preventing portion 150 includes a stopper 151 fixedly disposed on the lid base 110, a partial gear 152 rotatably disposed on the lid base 110, an elastic portion 154 connected to the partial gear 152 to provide a restoration power, and a locking portion 155 disposed on the partial gear 152.

Figure 19:
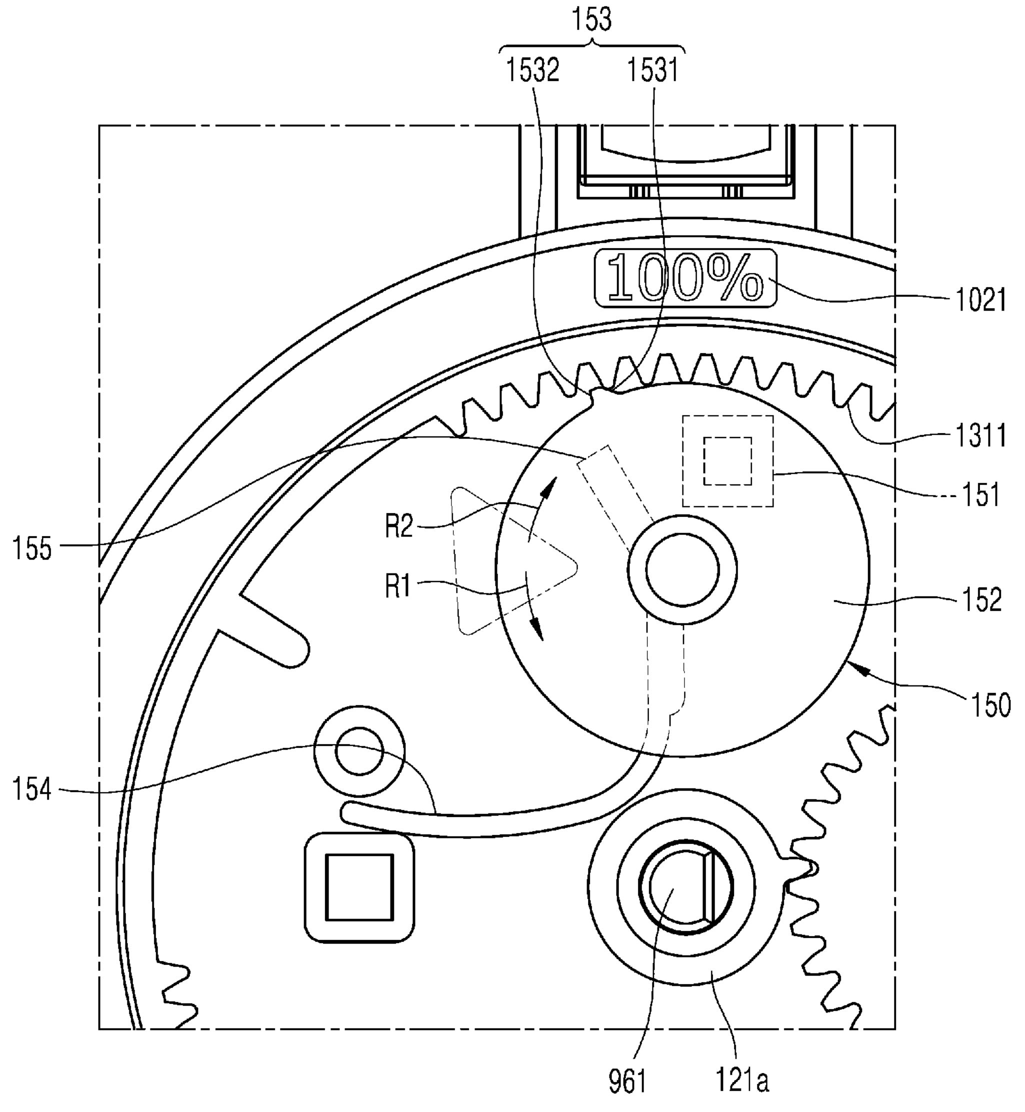
FIG. 19 is a diagram illustrating that a reverse rotation preventing portion allows a forward rotation of a lid rotating plate, according to an example.
Figure 20:
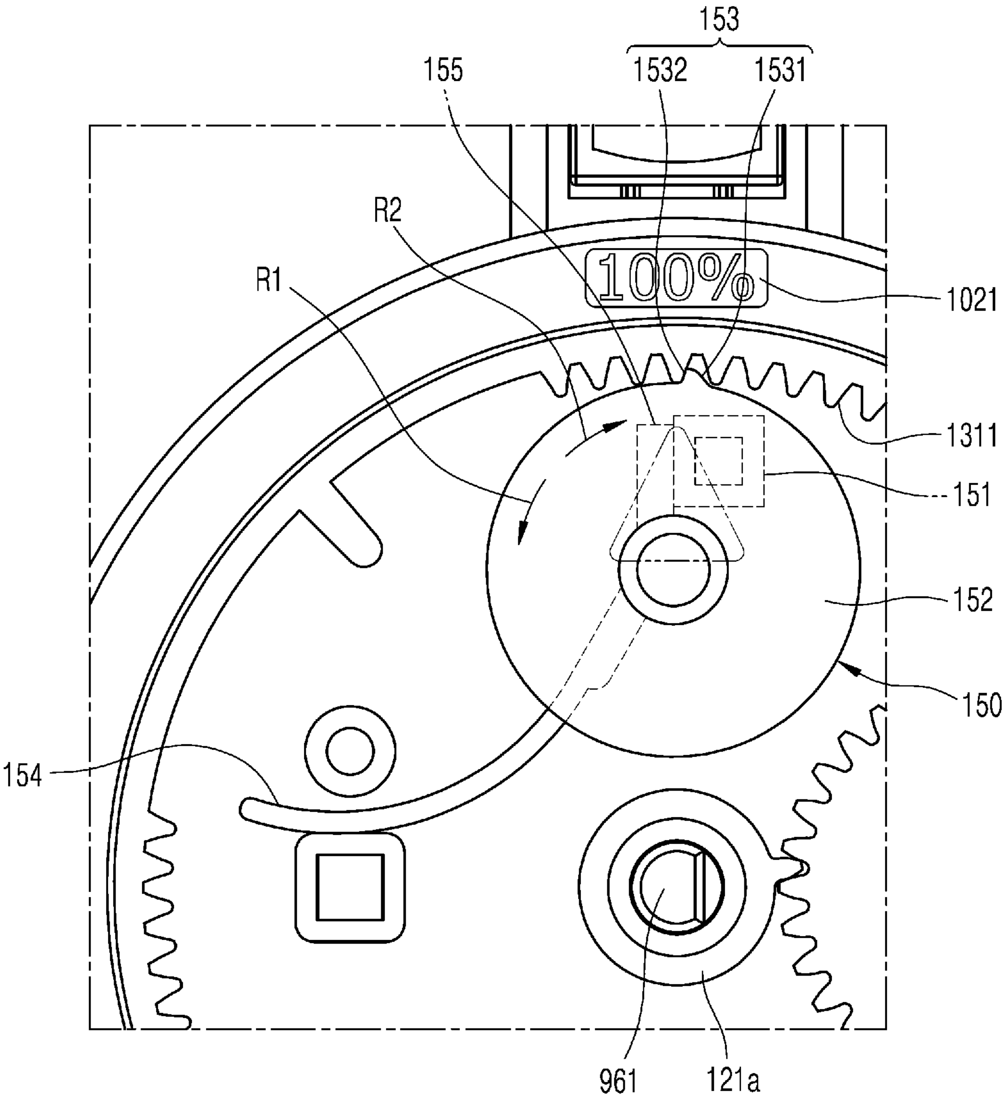
FIG. 20 is a diagram illustrating that the reverse rotation preventing portion restricts a reverse rotation of the lid rotating plate, according to an example.

FIG. 19 is a diagram illustrating that the reverse rotation preventing portion 150 allows a forward rotation of the lid rotating plate 130 according to an example, and FIG. 20 is a diagram illustrating that the reverse rotation preventing portion 150 restricts a reverse rotation of the lid rotating plate 130 according to an example.

Referring to FIG. 19, the partial gear 152 has teeth 153 partially disposed on the outer circumferential surface, and the teeth 153 are engaged with the internally toothed gear 1311. In the teeth 153, an inclination angle of a first surface 1531 facing the forward direction is smaller than an inclination angle of a second surface 1532 facing the reverse direction.

When the internally toothed gear 1311 rotates in the forward direction, for example, counterclockwise, the partial gear 152 rotates in a first direction R1 until a contact with the teeth of the internally toothed gear 1311 is released. The teeth of the internally toothed gear 1311 may move naturally along the first surface 1531 of the teeth 153 of the partial gear 152. When the teeth 153 of the partial gear 152 are released from contact with the teeth of the internally toothed gear 1311, the partial gear 152 rotates in a second direction R2 by a restoration power provided by the elastic portion 154 and restored to its original position.

Referring to FIG. 20, when the internally toothed gear 1311 rotates in the reverse direction, the teeth of the internally toothed gear 1311 come into contact with a second surface 1532 of the teeth 153. At this time, a movement of the locking portion 155 disposed on the partial gear 152 is restricted by a contact with the stopper 151. Accordingly, the partial gear 152 is restricted to rotating in the second direction R2, and eventually the reverse rotation of the internally toothed gear 1311 engaged with the partial gear 152 and the lid rotating plate 130 provided with the internally toothed gear 1311 is blocked. As described above, the reverse rotation preventing portion 150 may prevent the lid rotating plate 130 of the discharge completion display module 100B according to an example from being arbitrarily manipulated.

In the above-described examples, the examples in which the discharge completion display modules 100, 100A, and 100B are provided at one end of the body member 91 have been described. However, the discharge completion display modules 100, 100A, and 100B are not limited thereto, and may be modified in various ways. For example, at least some of the discharge completion display modules 100, 100A, and 100B may be disposed on the side of the body member 91.

Figure 21:
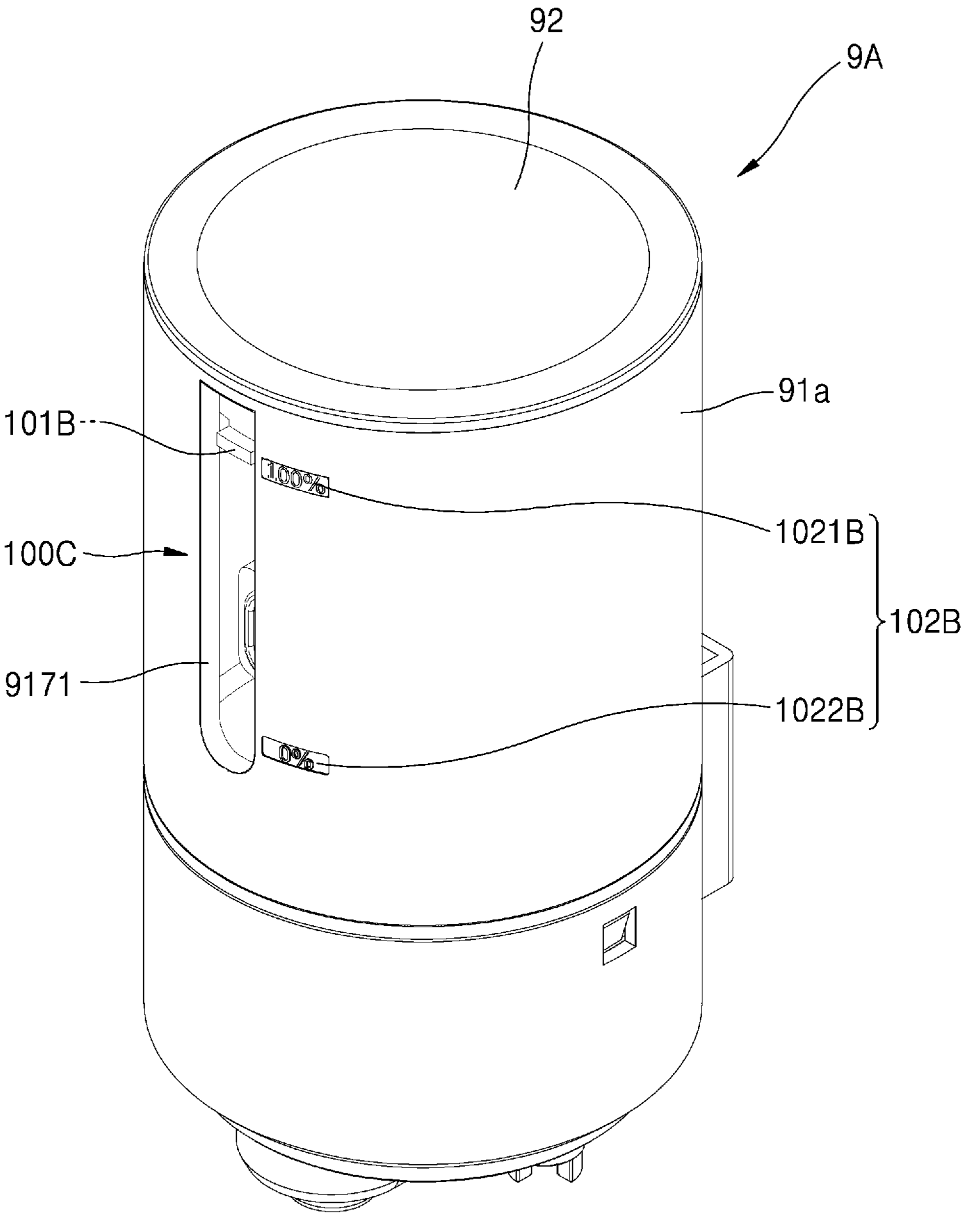
FIGS. 21 and 22 are respectively an assembled perspective view and an exploded perspective view illustrating a toner refill cartridge including a discharge completion display module, according to another example.
Figure 22:
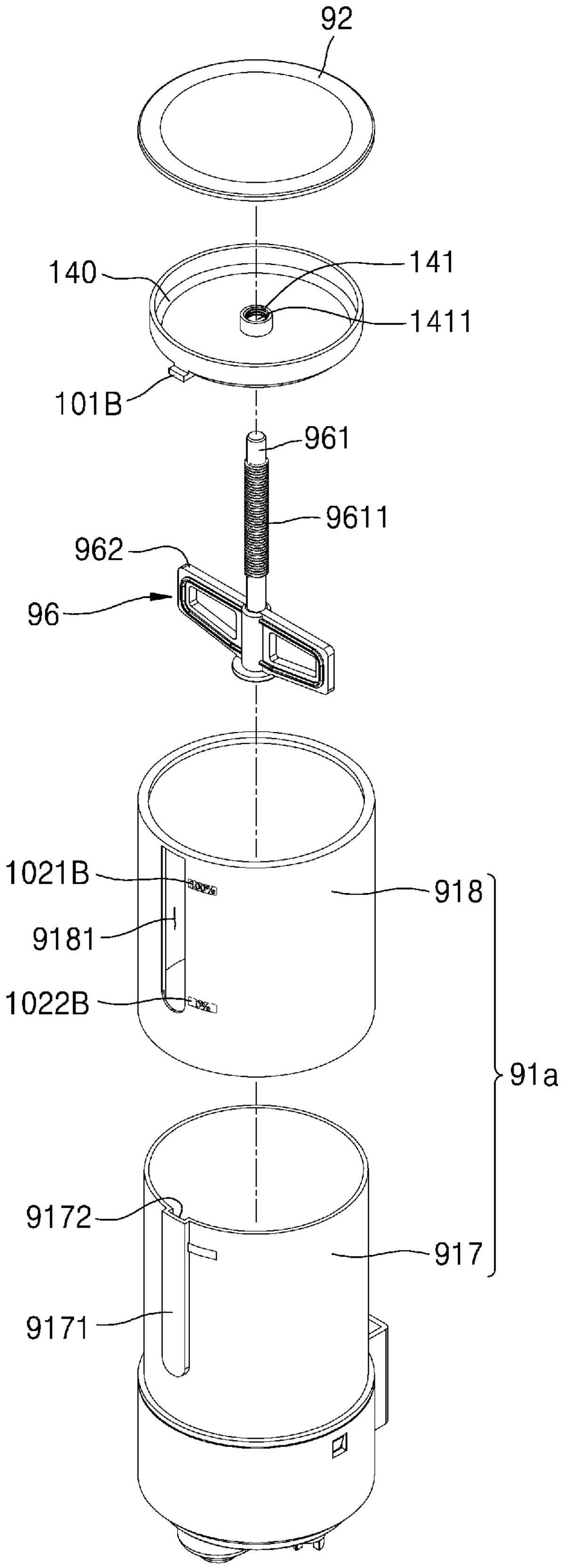
Figure 23:
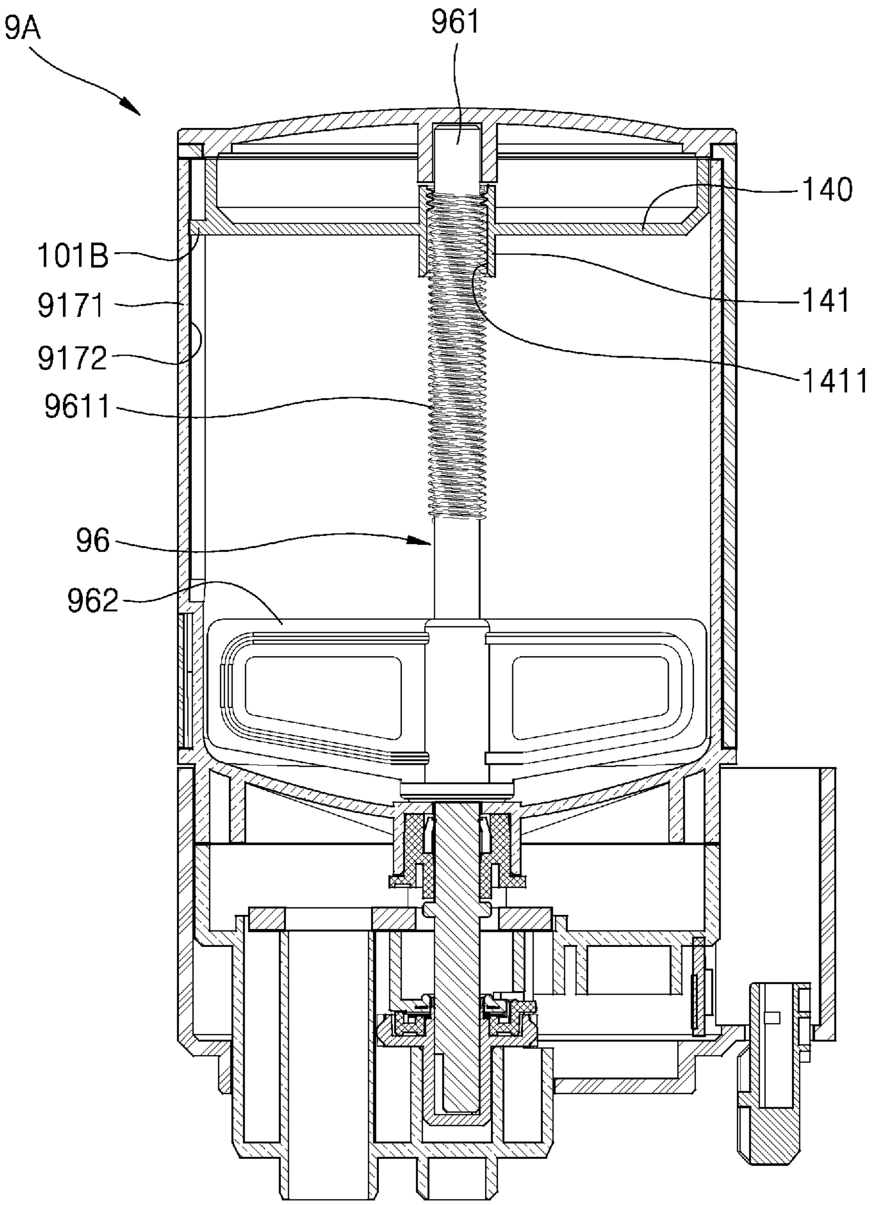
FIG. 23 is a cross-sectional view illustrating the toner refill cartridge of FIG. 21.
Figure 24:
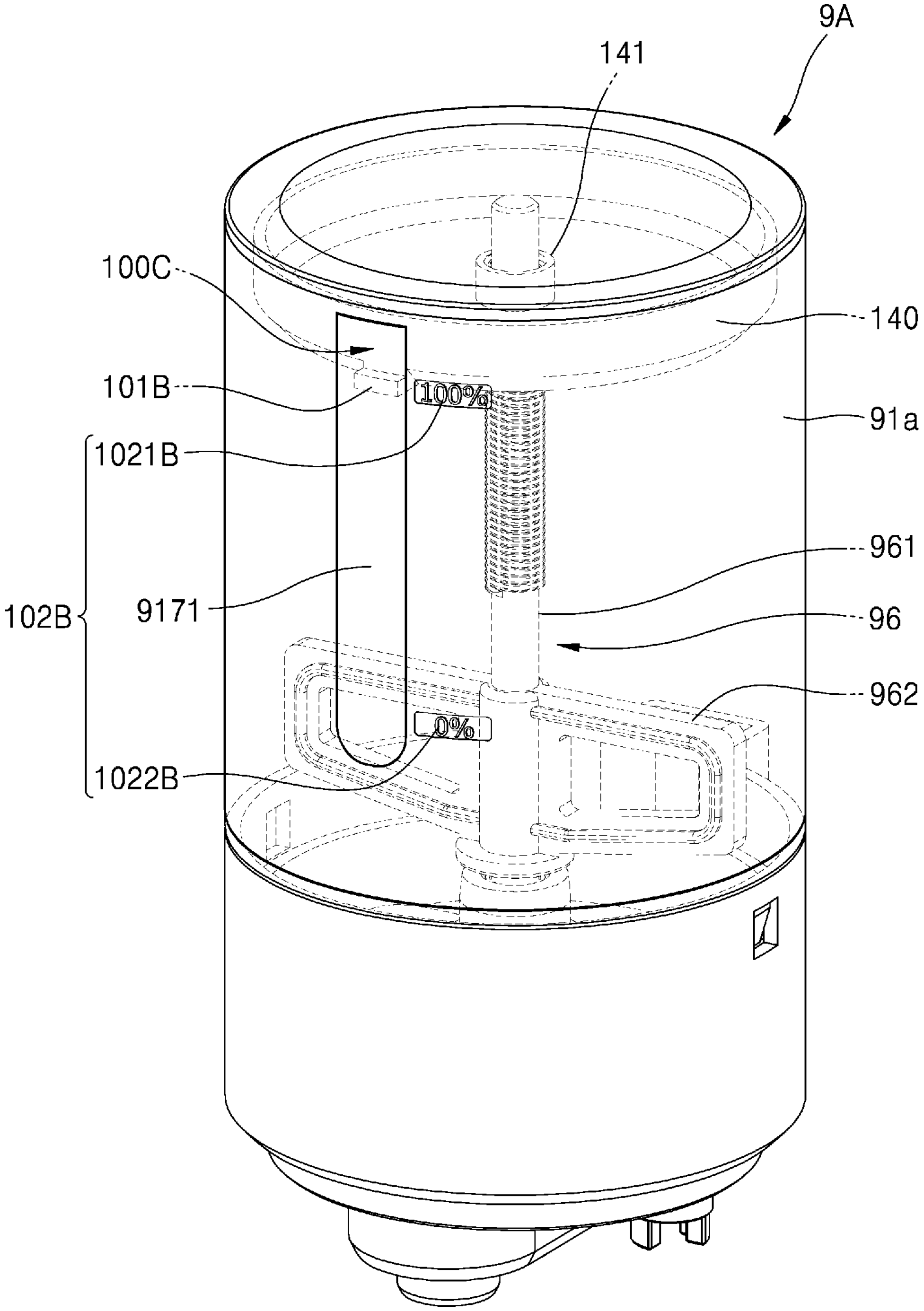
FIGS. 24 and 25 are diagrams illustrating operations of the discharge completion display module of FIG. 21.
Figure 25:
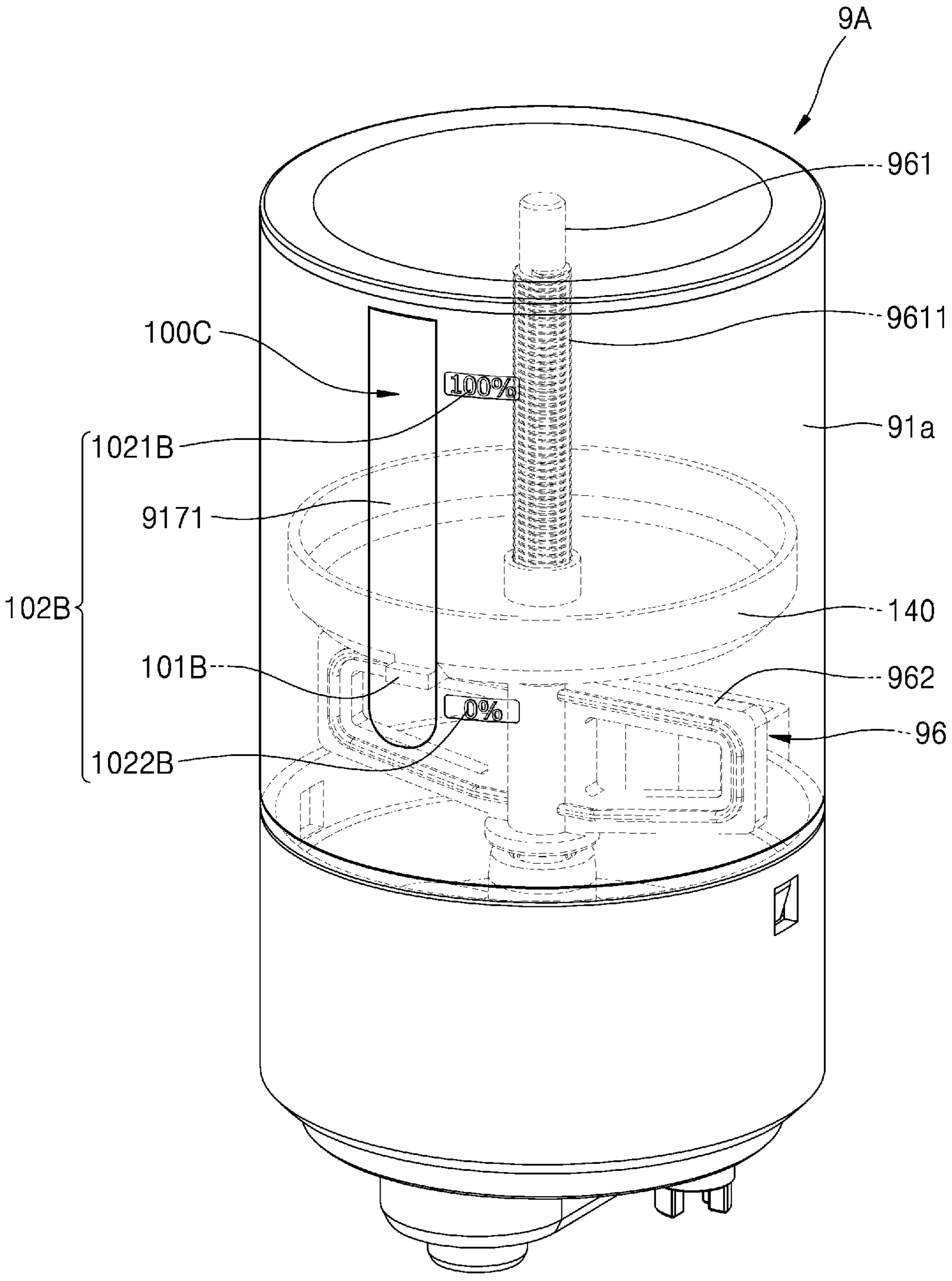

FIGS. 21 and 22 are respectively an assembled perspective view and an exploded perspective view illustrating a toner refill cartridge 9A including a discharge completion display module 100C according to another example. FIG. 23 is a cross-sectional view illustrating the toner refill cartridge 9A of FIG. 21, and FIGS. 24 and 25 are diagrams illustrating operations of the discharge completion display module 100C of FIG. 21.

Referring to FIGS. 21 and 22, in the toner refill cartridge 9A according to an example, at least a part of the discharge completion display module 100C may be disposed on the side of a body member 91*a*. Redundant descriptions of the same elements as those in the above-described examples are omitted, and differences therebetween are mainly described below.

The body member 91*a* includes a window 9171 extending in a longitudinal direction. The body member 91*a* includes a first body member 917 in which a toner is contained, and a second body member 918 disposed to surround the first body member 917. The window 9171 protrudes from the first body member 917, and a window hole 9181 into which the window 9171 is inserted is disposed in the second body member 918.

A fixed display portion 102B may be provided in a part of the body member 91*a* adjacent to the window 9171. The fixed display portion 102B may be provided at a part of the second body member 918 adjacent to the window hole 9181. As another example, although not shown, the fixed display portion 102B may be provided on the window 9171.

The discharge completion display module 100C may further include a toner pressure plate 140 descending in the inside of the body member 91*a* in the longitudinal direction of the body member 91*a*. As the toner pressure plate 140 descends, the toner contained in the body member 91*a* may be pressed in a downward direction. The toner pressure plate 140 may descend by rotation of the agitating member 96. To this end, the toner pressure plate 140 includes a penetrating portion 141 through which the agitating axis 961 of the agitating member 96 passes. The toner pressure plate 140 may be screwed to be movable in the longitudinal direction of the body member 91*a* with respect to the agitating axis 961 of the agitating member 96, through the penetrating portion 141. A male screw 9611 is formed on the agitating axis 961 of the agitating member 96, and a female screw 1411 is formed on the penetrating portion 141.

A moving display portion 101B is disposed in the toner pressure plate 140 to be exposed to the outside through the window 9171. The moving display portion 101B protrudes toward the window 9171, and the first body member 917 includes a concave portion 9172 into which the moving display portion 101B is insertable. The concave portion 9172 extends in the longitudinal direction of the body member 91*a*.

Referring to FIGS. 22 to 25, the male screw 9611 of the agitating axis 961 is engaged with the female screw 1411 of the penetrating portion 141. The moving display portion 101 is inserted into the concave portion 9172, and a movement thereof is guided by the concave portion 9172. Because the moving display portion 101 is inserted into the concave portion 9172, the moving display portion 101 is movable in an extending direction of the concave portion 9172, and a rotation thereof is restricted.

Referring to FIGS. 23 and 24, when the agitating member 96 is in a state before rotation, the toner pressure plate 140 is positioned in an upper portion of the body member 91*a*. The moving display portion 101B disposed on the toner pressure plate 140 is exposed to the outside through the window 9171 of the body member 91*a*. The moving display portion 101B is disposed at a position corresponding to a first information display 1021B of a fixed display portion 102B.

Thereafter, as the driving power input portion 94 rotates, the agitating axis 961 of the agitating member 96 rotates. The rotation power of the agitating member 96 is transmitted to the toner pressure plate 140 screwed to the agitating axis 961. Because a movement direction of the moving display portion 101B is guided by the concave portion 9172, the toner pressure plate 140 descends in the longitudinal direction of the body member 91*a* without a rotation. As the agitating member 96 rotates, the toner is bent and the toner pressure plate 140 presses the toner in the downward direction.

Referring to FIGS. 23 and 25, the toner pressure plate 140 descends so as to be close to the agitating blade 962 of the agitating member 96. At this time, the moving display portion 101B disposed on the toner pressure plate 140 also descends and moves to a position corresponding to a second information display 1022B. As a result, the moving display portion 101 moves from the position corresponding to the first information display 1021B to the position corresponding to the second information display 1022B.

A user may easily identify whether the toner has been completely discharged from the toner refill cartridge 9A by identifying a position of the moving display portion 101B relative to the fixed display portion 102B in the discharge completion display module 100C of the toner refill cartridge 9A.

It should be understood that examples described herein should be considered in a descriptive sense only and not for purposes of limitation. Descriptions of features or aspects within each example should typically be considered as available for other similar features or aspects in other examples. While one or more examples have been described with reference to the figures, it will be understood by those of ordinary skill in the art that various changes in form and details may be made therein without departing from the spirit and scope as defined by the following claims.

What is claimed is:

1. A toner refill cartridge comprising:

a body member in which a toner is contained and comprising a toner discharge port through which the toner is discharged;

a driving power input portion rotatable by a driving power from outside the toner refill cartridge; and display module comprising a moving display portion to move in response to a rotation power from the driving power input portion, and a fixed display portion whose position is fixed with respect to the body member, the display module to indicate whether the toner contained in the body member has been completely discharged, based on a position relationship of the moving display portion with respect to the fixed display portion.

2. The toner refill cartridge of claim 1, wherein the display module is to receive the rotation power from the driving power input portion through an agitating member.

3. The toner refill cartridge of claim 2, wherein the display module is arranged at one end of the body member.

4. The toner refill cartridge of claim 3, wherein the display module comprises a lid base combined with one end of the body member, and a lid rotating plate rotatably combined with respect to the lid base, wherein the fixed display portion is provided on the lid base, and wherein the moving display portion is provided on the lid rotating plate.

5. The toner refill cartridge of claim 4, wherein the lid base comprises a lid fixing portion to cover one end of the body member, and a lid rim portion fixed to the lid fixing portion and to surround a rim of the lid rotating plate, and wherein the fixed display portion is provided on the lid rim portion.

6. The toner refill cartridge of claim 4, wherein one of the fixed display portion and the moving display portion comprises a first information display to display a state before the toner is discharged from the toner refill cartridge and a second information display to display a state in which the toner has been completely discharged from the toner refill cartridge, and wherein the other one of the fixed display portion and the moving display portion comprises an indicator indicating the first information display or the second information display.

7. The toner refill cartridge of claim 4, wherein the lid base comprises a gear assembly to rotate the lid rotating plate by receiving power from an agitating axis of the agitating member, and wherein the lid rotating plate comprises a support portion to insert into the lid base, and an internally toothed gear rotated by the gear assembly is provided on an inner circumferential surface of the support portion.

8. The toner refill cartridge of claim 7, wherein the gear assembly comprises a connecting gear connected to the agitating axis of the agitating member; and at least one reduction gear configured to connect between the connecting gear and the internally toothed gear, wherein a rotation speed of the internally toothed gear is slower than a rotation speed of the connecting gear.

9. The toner refill cartridge of claim 7, wherein the gear assembly comprises:

a first connecting gear connected to the agitating axis of the agitating member; and a second connecting gear connected between the first connecting gear and the internally toothed gear, and wherein the first connecting gear is a partial gear in which teeth are partially formed on an outer circumferential surface of the partial gear.

10. The toner refill cartridge of claim 7, further comprising a reverse rotation preventing portion installed on the lid base, the reverse rotation preventing portion to allow a forward rotation of the internally toothed gear and block a reverse rotation of the internally toothed gear.

11. The toner refill cartridge of claim 10, wherein the reverse rotation preventing portion comprises:

a stopper fixedly arranged on the lid base;

a partial gear rotatable with respect to the lid base and arranged to engage the internally toothed gear;

an elastic portion connected to the partial gear and to provide a restoration power to restore the partial gear to its original position after the partial gear rotates in a first direction; and a locking portion arranged on the partial gear and to restrict the partial gear to rotate in a second direction opposite to the first direction by contact with the stopper.

12. The toner refill cartridge of claim 1, wherein the display module further comprises a sound generating portion that operates by receiving the rotation power from the driving power input portion, the sound generating portion to generate sound responsive to the moving display portion reaching a position corresponding to the fixed display portion.

13. The toner refill cartridge of claim 12, wherein the display module comprises a lid base combined with one end of the body member, and a lid rotating plate rotatably combined with respect to the lid base, wherein the fixed display portion is provided on the lid base, and wherein the moving display portion is provided on the lid rotating plate, and wherein the sound generating portion comprises:

a sound inducing protrusion arranged on the lid rotating plate; and a sound member arranged on the lid base, the sound member having a cantilever shape and to generate sound responsive to a contact between the sound member and the sound inducing protrusion being released.

14. The toner refill cartridge of claim 1, wherein at least a part of the display module is on a side of the body member.

15. The toner refill cartridge of claim 14, wherein the body member comprises a window extending in a longitudinal direction, and the fixed display portion is provided on the window or a part of the body member adjacent to the window, wherein the display module further comprises a toner pressure plate that descends in the longitudinal direction of the body member by rotation of an agitating member inside the body member, wherein the moving display portion is provided on the toner pressure plate so to be exposed through the window, and wherein, in a case where the toner pressure plate descends, descending of the moving display portion is identifiable through the window.

16. The toner refill cartridge of claim 1, comprising an agitating member to agitate the toner while being rotated by the rotation power from the driving power input portion.

* * * * *